US008092686B2

(12) United States Patent
Wright et al.

(10) Patent No.: US 8,092,686 B2
(45) Date of Patent: *Jan. 10, 2012

(54) MODIFIED AMINE-ALDEHYDE RESINS AND USES THEREOF IN SEPARATION PROCESSES

(75) Inventors: James T. Wright, Lithonia, GA (US); Carl R. White, Conyers, GA (US); Kurt Gabrielson, Lilburn, GA (US); John B. Hines, Atlanta, GA (US); Lisa M. Arthur, Atlanta, GA (US); Michael J. Cousin, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 1570 days.

This patent is subject to a terminal disclaimer.

(21) Appl. No.: 11/473,314

(22) Filed: Jun. 23, 2006

(65) Prior Publication Data

US 2007/0000839 A1    Jan. 4, 2007

Related U.S. Application Data

(63) Continuation-in-part of application No. 11/298,948, filed on Dec. 12, 2005, now Pat. No. 7,913,852.

(60) Provisional application No. 60/638,143, filed on Dec. 23, 2004, provisional application No. 60/713,339, filed on Sep. 2, 2005.

(51) Int. Cl.
 *B01D 15/00* (2006.01)
 *B01J 39/00* (2006.01)
 *B03D 1/16* (2006.01)
 *B03D 1/02* (2006.01)
 *C01G 1/00* (2006.01)

(52) U.S. Cl. ........ 210/660; 210/705; 210/794; 209/166; 209/167

(58) Field of Classification Search .................. 210/660, 210/705, 794; 209/166, 167
See application file for complete search history.

(56) References Cited

U.S. PATENT DOCUMENTS 2,180,926 A    11/1939    Jayne et al.
(Continued)

FOREIGN PATENT DOCUMENTS

EP    0005390    11/1979
(Continued)

OTHER PUBLICATIONS

*Study of the Hydrophilizing Action of Urea-Formaldehyde Resins on Carbonate Clay Impurities in Potassium Ores*, Inst. Obshch. Neorg. Khim, USSR, Vestsi Akademii Navuk BSSR, Seryya Khimichnykh Navuk (1980).
*Effect of Urea-Formaldehyde Resins on the Flotation of Potassium Ores*, Khimicheskaya Promyshlennost, Moscow, Russian Federation (1980).

(Continued)

*Primary Examiner* — Duc Truong
(74) *Attorney, Agent, or Firm* — Michael S. Kerns

(57) ABSTRACT

Modified resins are disclosed for removing a wide variety of solids and/or ionic species from the liquids in which they are suspended and/or dissolved. These modified resins are especially useful as froth flotation depressants in the beneficiation of many types of materials (e.g., mineral and metal ores), including the beneficiation of impure coal comprising clay impurities, as well as in the separation of valuable bitumen from solid contaminants such as sand. The modified resins are also useful for treating aqueous liquid suspensions to facilitate the removal of solid particulates, as well as the removal of metallic ions in the purification of water. The modified resins comprise a base resin that is modified with a coupling agent, which is highly selective for binding to solid contaminants and especially siliceous materials such as sand or clay.

6 Claims, 1 Drawing Sheet

U.S. PATENT DOCUMENTS

| | | | |
|---|---|---|---|
| 2,373,305 | A | 4/1945 | Gieseke |
| 2,428,752 | A | 10/1947 | Hewett |
| 2,569,680 | A | 10/1951 | Leek |
| 2,641,584 | A | 6/1953 | Martone, Jr. |
| 2,919,802 | A | 1/1960 | Drake |
| 3,017,028 | A | 1/1962 | Schoeld et al. |
| 3,061,097 | A | 10/1962 | Dering |
| 3,224,582 | A | 12/1965 | Iannicelli |
| 3,260,365 | A | 7/1966 | Dickson et al. |
| 3,286,849 | A | 11/1966 | Watanabe |
| 3,425,549 | A | 2/1969 | Dickson et al. |
| 3,509,021 | A | 4/1970 | Woodward |
| 3,572,504 | A | 3/1971 | DeCuyper |
| 3,782,546 | A | 1/1974 | Kirwin et al. |
| 3,896,081 | A | 7/1975 | Baxter et al. |
| 3,929,629 | A | 12/1975 | Griffith et al. |
| 3,990,965 | A | 11/1976 | Csillag et al. |
| 4,045,385 | A | 8/1977 | Klein et al. |
| 4,078,993 | A | 3/1978 | Griffith et al. |
| 4,128,475 | A | 12/1978 | Wang et al. |
| 4,139,455 | A | 2/1979 | Griffith et al. |
| 4,155,847 | A | 5/1979 | Tanaka et al. |
| 4,169,914 | A | 10/1979 | Gallacher |
| 4,208,487 | A | 6/1980 | Wang et al. |
| 4,220,525 | A | 9/1980 | Petrovich |
| 4,339,331 | A | 7/1982 | Lim et al. |
| 4,360,425 | A | 11/1982 | Lim et al. |
| 4,407,976 | A | 10/1983 | Merz et al. |
| 4,514,292 | A | 4/1985 | Burdick |
| 4,657,666 | A | 4/1987 | Snook et al. |
| 4,719,009 | A | 1/1988 | Furey et al. |
| 4,720,339 | A | 1/1988 | Nagaraj et al. |
| 4,765,823 | A | 8/1988 | Lurssen |
| 4,775,725 | A | 10/1988 | Depasquale et al. |
| 4,778,510 | A | 10/1988 | Hawkins |
| 4,783,270 | A | 11/1988 | Murao et al. |
| RE32,875 | E | 2/1989 | Kari et al. |
| 4,902,442 | A | 2/1990 | Garces |
| 4,902,764 | A | 2/1990 | Rothenberg et al. |
| 4,935,149 | A | 6/1990 | Morse |
| 4,952,329 | A | 8/1990 | Bulatovic et al. |
| 4,990,262 | A | 2/1991 | Sharpe, Jr. |
| 4,990,263 | A | 2/1991 | Sharpe, Jr. |
| 5,047,144 | A | 9/1991 | Dobias et al. |
| 5,049,612 | A | 9/1991 | Bulatovic et al. |
| 5,074,993 | A | 12/1991 | Kerr et al. |
| 5,147,528 | A | 9/1992 | Bulatovic |
| 5,362,842 | A | 11/1994 | Graves et al. |
| 5,389,716 | A | 2/1995 | Graves |
| 5,507,395 | A | 4/1996 | Wang et al. |
| 5,525,212 | A | 6/1996 | Nagari et al. |
| 5,533,626 | A | 7/1996 | Nagaraj et al. |
| 5,622,647 | A | 4/1997 | Kerr et al. |
| 5,624,569 | A | 4/1997 | Chung et al. |
| 5,674,971 | A | 10/1997 | Graves |
| 5,693,692 | A | 12/1997 | Bulatovic et al. |
| 6,114,491 | A | 9/2000 | Dupre et al. |
| 7,913,852 | B2 * | 3/2011 | Wright et al. .............. 209/166 |
| 2006/0151360 | A1 | 7/2006 | Wright et al. |
| 2006/0151397 | A1 | 7/2006 | Wright et al. |
| 2007/0000839 | A1 | 1/2007 | Wright et al. |
| 2007/0012630 | A1 | 1/2007 | Wright et al. |
| 2008/0017552 | A1 | 1/2008 | Wright et al. |
| 2008/0029460 | A1 | 2/2008 | Wright et al. |

FOREIGN PATENT DOCUMENTS

| | | |
|---|---|---|
| EP | 0042813 | 12/1981 |
| GB | 480316 | 2/1938 |
| GB | 799873 | 8/1958 |
| GB | 1485733 | 9/1977 |
| GB | 2154224 A | 9/1985 |
| RU | 2165798 C1 | 4/2001 |
| RU | 2169740 C1 | 6/2001 |
| SU | 276845 | 7/1970 |
| SU | 427737 | 5/1974 |
| SU | 427737 T | 5/1974 |
| SU | 431709 | 9/1974 |
| SU | 642000 | 1/1979 |
| SU | 724203 | 3/1980 |
| SU | 724203 T | 3/1980 |
| SU | 827175 A | 5/1981 |
| SU | 876171 | 10/1981 |
| WO | 86/07072 | 12/1986 |
| WO | 2006/071672 | 7/2006 |
| WO | 2006/071673 | 7/2006 |
| WO | 2007/149587 A2 | 12/2007 |

OTHER PUBLICATIONS

*Adsorption of Urea-Formaldehyde Resins on Clay Minerals of Potassium Ores*, Inst. Obshch Neorg. Khim., Minsk, USSR, Doklady Akademii Nauk BSSR (1974).

Wert, E. et al., *Pilot Plant Testing of Dissolved Air Flotation for Algae and Arsenic Removal*, Southern Nevada Water Authority, Boulder City, NV, USA. Proceedings—Water Quality Technology Conference, p. 902-18 (2003).

CQ, Inc., Coal Cleaning Primer, found at http://www.cg-inc.com/Coal_Primer.pdf.

Chapter 5, Reagents of Laskowski, J., Coal Flotation and Fine Coal Utilization, Developments in Mineral Processing, vol. 14 (2001).

Coal Preparation (Prep) Page, found at http://66.113.204.26/mining/coalprep.htm.

International Search Report for PCT/US2007/014713 which is not a counterpart PCT application, but is directed to related subject matter.

Adsorption of Octadecylamine on Potassium Chloride from Clay-Salt Dispersions Modified with Urea- and Guanidine-Formaldehyde Resins, Int. Obshch. Neorg. Khim., Minsk, USSR. Vestsi Akademii Navuk BSSR, Seryya Khimichnykh Navuk (1984).

PCT International Search Report that issued in International Application No. PCT/US2005/046365, which is not the counterpart PCT application, but is directed to related subject matter.

Aleksandrovich et al., Effect of Urea-Formaldehyde Resins on the Flotation of Potassium Ores, Khimicheskaya Promyshlennost, 1980, Moscow, Russian Federation.

International Search Report for PCT/US2008/066538, mailed Sep. 11, 2008, European Patent Office, Rijswijk, Netherlands.

Aleksandrovich et al., Effect of Urea-Formaldehyde Resins on the Flotation of Potassium Ores, Khimicheskaya Promyshlennost, 1980, Moscow, Russian Federation.

International Search Report for PCT/US2005/046364 mailed Nov. 3, 2006, which is the counterpart PCT application for the parent application.

PCT International Search Report and Written Opinion for PCT/US08/66534, mailed Sep. 19, 2008, 7 pages, European Patent Office, Rijswijk, Netherlands.

Markin, A.D., et al., Structural-Rheological Properties of Solutions of Urea- and Guanidine-Formaldehyde Resins, Vestsi Akademii Navuk BSSR, Seryya Khimichnykh Navuk (1983), vol. 5, pp. 57-60, Inst. Obshch. Neorg. Khim., Minsk, USSR.

Litvinenko, E.E., et al., Use of Wastes from Titanium Production in Flotation of Potassium Ores, Khimicheskaya Promyshlennost (Moscow, Russian Federation), 1982, vol. 5, pp. 393-395 USSR.

Markin, A.D., et al., Study of Depressing Properties of Biuret-Formaldehyde Resins in the Flotation of Potassium Ores, Vestsi Akademii Navuk BSSR, Seryya Khimichnykh Navuk, 1980, vol. 2, pp. 112-115, Inst. Obshch, Neorg. Khim., Minsk, USSR.

Aleksandrovich, Kh. M., Action of Depressor Reagents During the Selective Flotation of Potassium Salts, Obogashchenie Rud (Sankt-Peterburg, Russian Federation), 1972, vol. 17, No. 3, pp. 17-20, USSR.

Aleksandrovich, Kh. M., et al., Effect of Depressor Reagents on the Ion Composition of Salt Solutions During the Flotation of Potassium Salts, Vestsi Akademii Navuk BSSR, Seryya Khimichnykh Navuk, 1972, vol. 4, pp. 58-61, Inst. Obshch. Neorg. Khim., Minsk, USSR.

Tkachev, V.V., et al, Pollution of a Mine Atmosphere During Pumping of a Urea-Formaldehyde Resin Solution into a Coal Seam, Institute of Labor Hygiene and Professional Illnesses, Academy of Medical Sciences, Received. Nov. 25, 1977, USSR.

* cited by examiner

MODIFIED AMINE-ALDEHYDE RESINS AND USES THEREOF IN SEPARATION PROCESSES

CROSS-REFERENCE TO RELATED APPLICATIONS

This application is a continuation-in-part of U.S. application Ser. No. 11/298,948, filed Dec. 12, 2005 now U.S. Pat No. 7,913,852, which claims the benefit of priority of U.S. Provisional Patent Application No. 60/638,143, filed Dec. 23, 2004, and Ser. No. 60/713,339, filed Sep. 2, 2005, each of which is hereby incorporated by reference in its entirety.

FIELD OF THE INVENTION

The present invention relates to modified resins for use in separation processes, and especially the selective separation of solids and/or ionic species such as metallic cations from aqueous media. Such processes include froth flotation (e.g., used in ore beneficiation), the separation of drill cuttings from oil drilling fluids, clay and coal slurry dewatering, sewage purification, pulp and paper mill effluent processing, the removal of sand from bitumen, and the purification of water to render it potable. The modified resins comprise a base resin that is the reaction product of a primary or secondary amine and an aldehyde (e.g., a urea-formaldehyde resin). The base resin is modified with a coupling agent (e.g., a substituted silane) during or after its preparation.

BACKGROUND OF THE INVENTION

Froth Flotation

Industrially, processes for the purification of liquid suspensions or dispersions (and especially aqueous suspensions or dispersions) to remove suspended solid particles are quite prevalent. Froth flotation, for example, is a separation process based on differences in the tendency of various materials to associate with rising air bubbles. Additives are often incorporated into the froth flotation liquid (e.g., aqueous brine) to improve the selectivity of the process. For example, "collectors" can be used to chemically and/or physically absorb onto mineral(s) (e.g., those comprising value metals) to be floated, rendering them more hydrophobic. On the other hand, "depressants," typically used in conjunction with collectors, render other materials (e.g., gangue minerals) less likely to associate with the air bubbles, and therefore less likely to be carried into the froth concentrate.

In this manner, some materials (e.g., value minerals or metals) will, relative to others (e.g., gangue materials), exhibit preferential affinity for air bubbles, causing them to rise to the surface of the aqueous slurry, where they can be collected in a froth concentrate. A degree of separation is thereby effected. In less common, so-called reverse froth flotations, it is the gangue that is preferentially floated and concentrated at the surface, with the desired materials removed in the bottoms. Gangue materials typically refer to quartz, sand and clay silicates, and calcite, although other minerals (e.g., fluorite, barite, etc.,) may be included. In some cases, the material to be purified comprises predominantly such materials, and the smaller amounts of contaminants are preferentially floated. For example, in the beneficiation of kaolin clay, a material having a number of industrially significant applications, iron and titanium oxides can be separated by flotation from the impure, clay-containing ore, leaving a purified kaolin clay bottoms product.

The manner in which known collectors and depressants achieve their effect is not understood with complete certainty, and several theories have been proposed to date. Depressants, for example may prevent the gangue minerals from adhering to the value materials to be separated, or they may even prevent the collector(s) from absorbing onto the gangue minerals. Whatever the mechanism, the ability of a depressant to improve the selectivity in a froth flotation process can very favorably impact its economics.

Overall, froth flotation is practiced in the beneficiation of a wide variety of value materials (e.g., mineral and metal ores and even high molecular weight hydrocarbons such as bitumen), in order to separate them from unwanted contaminants which are unavoidably co-extracted from natural deposits. In the case of solid ore beneficiation, the use of froth flotation generally comprises grinding the crude ore into sufficiently small, discrete particles of a value mineral or metal and then contacting an aqueous "pulp" of this ground ore with rising air bubbles, typically while agitating the pulp. Prior to froth flotation, the crude ore may be subjected to any number of preconditioning steps, including selective crushing, screening, desliming, gravity concentration, electrical separation, low temperature roasting, and magnetic differentiation.

Another particular froth flotation process of commercial significance involves the separation of bitumen from sand and/or clay, which are ubiquitous in oil sand deposits, such as those found in the vast Athabasca region of Alberta, Canada. Bitumen is recognized as a valuable source of "semi-solid" petroleum or heavy hydrocarbon-containing crude oil, which can be upgraded into many valuable end products including transportation fuels such as gasoline or even petrochemicals. Alberta's oil sand deposits are estimated to contain 1.7 trillion barrels of bitumen-containing crude oil, exceeding the reserves in all of Saudi Arabia. For this reason, significant effort has been recently expended in developing economically feasible operations for bitumen recovery, predominantly based on subjecting an aqueous slurry of extracted oil sand to froth flotation. For example, the "Clark Process" involves recovering the bitumen in a froth concentrate while depressing the sand and other solid impurities.

Various gangue depressants for improving froth flotation separations are known in the art and include sodium silicate, starch, tannins, dextrins, lignosulphonic acids, carboxyl methyl cellulose, cyanide salts and many others. More recently certain synthetic polymers have been found advantageous in particular beneficiation processes involving froth flotation. For example, U.S. Pat. No. Re. 32,875 describes the separation of gangue from phosphate minerals (e.g., apatite) using as a depressant a phenol-formaldehyde copolymer (e.g., a resol, a novolak) or a modified phenol polymer (e.g., a melamine-modified novolak).

U.S. Pat. No. 3,990,965 describes the separation of iron oxide from bauxite using as a depressant a water soluble prepolymer of low chain length that adheres selectively to gangue and that can be further polymerized to obtain a cross-linked, insoluble resin.

U.S. Pat. No. 4,078,993 describes the separation of sulfide or oxidized sulfide ores (e.g., pyrite, pyrrhotite, or sphalerite) from metal mineral ores (e.g., copper, zinc, lead, nickel) using as a depressant a solution or dispersion of a low molecular weight condensation product of an aldehyde with a compound containing 2-6 amine or amide groups.

U.S. Pat. Nos. 4,128,475 and 4,208,487 describe the separation of gangue materials from mineral ore using a conventional frothing agent (e.g., pine oils) combined with a (preferably alkylated) amino-aldehyde resin that may have free methylol groups.

U.S. Pat. No. 4,139,455 describes the separation of sulfide or oxidized sulfide ores (e.g., pyrite, pyrrhotite, or sphalerite) from metal mineral ores (e.g., copper, zinc, lead, nickel) using as a depressant an amine compound (e.g., a polyamine) in which at least 20% of the total number of amine groups are tertiary amine groups and in which the number of quaternary amine groups is from 0 to not more than $\frac{1}{3}$ the number of tertiary amine groups.

U.S. Pat. No. 5,047,144 describes the separation of siliceous materials (e.g., feldspar) from minerals (e.g., kaolinite) using as a depressant a cation-active condensation product of aminoplast formers with formaldehyde, in combination with cation-active tensides (e.g., organic alkylamines) or anion-active tensides (e.g., long-chained alkyl sulfonates).

Russian Patent Nos. 427,737 and 276,845 describe the depression of clay slime using carboxymethyl cellulose and urea-formaldehyde resins, optionally combined with methacrylic acid-methacrylamide copolymers or starch ('845 patent).

Russian Patent Nos. 2,169,740; 2,165,798; and 724,203 describe the depression of clay carbonate slimes from ores in the potassium industry, including sylvinite (KCl—NaCl) ores. The depressant used is a urea/formaldehyde condensation product that is modified by polyethylenepolyamine. Otherwise, a guanidine-formaldehyde resin is employed ('203 patent).

Markin, A. D., et. al., describe the use of urea-formaldehyde resins as carbonate clay depressors in the flotation of potassium ores. *Study of the Hydrophilizing Action of Urea-Formaldehyde Resins on Carbonate Clay Impurities in Potassium Ores*, Inst. Obshch. Neorg.Khim, USSR, Vestsi Akademii Navuk BSSR, Seryya Khimichnykh Navuk (1980); *Effect of Urea-Formaldehyde Resins on the Flotation of Potassium Ores*, Khimicheskaya Promyshlennost, Moscow, Russian Federation (1980); and *Adsorption of Urea-Formaldehyde Resins on Clay Minerals of Potassium Ores*, Inst. Obshch Neorg. Khim., Minsk, USSR, Doklady Akademii Nauk BSSR (1974).

As is recognized in the art, a great diversity of materials can be subject to beneficiation/refinement by froth flotation. Likewise, the nature of both the desired and the unwanted components varies greatly. This is due to the differences in chemical composition of these materials, as well as in the types of prior chemical treatment and processing steps used. Consequently, the number and type of froth flotation depressants is correspondingly wide.

Also, the use of a given depressant in one service (e.g., raw potassium ore beneficiation) is not a predictor of its utility in an application involving a significantly different feedstock (e.g., bitumen-containing oil sand). This also applies to any expectation regarding the use of a depressant that is effective in froth flotation, in the any of the separations of solid contaminants from aqueous liquid suspensions, described below (and vice versa). The theoretical mechanisms by which froth flotation and aqueous liquid/solid separations occur are significantly different, where the former process relies on differences in hydrophobicity and the latter on several other possibilities (charge destabilization/neutralization, agglomeration, host-guest theory (including podands), hard-soft acid base theory, dipole-dipole interactions, Highest Occupied Molecular Orbital-Lowest unoccupied Molecular Orbital (HOMO-LUMO) interactions, hydrogen bonding, Gibbs free energy of bonding, etc). Traditional depressants in froth flotation for the benefication of metallic ores, such as guar gum, are not employed as dewatering agents, or even as depressants in froth flotation for bitumen separation. Moreover, in two of the applications described below (waste clay and coal dewatering), no agents are currently used to improve the solid/liquid separation. Overall, despite the large offering of flotation depressants and dewatering agents in the art, an adequate degree of refinement in many cases remains difficult to achieve, even, in the case of froth flotation, when two or more sequential "rougher" and "cleaner" flotations are employed. There is therefore a need in the art for agents which can be effectively employed in a wide range of separation processes, including both froth flotation and the separation of solid contaminants from liquid suspensions.

Other Separations

Other processes, in addition to froth flotation, for the separation of solid contaminants from liquid suspensions can involve the use of additives that either destabilize these suspensions or otherwise bind the contaminants into larger agglomerates. Coagulation, for example, refers to the destabilization of suspended solid particles by neutralizing the electric charge that separates them. Flocculation refers to the bridging or agglomeration of solid particles together into clumps or flocs, thereby facilitating their separation by settling or flotation, depending on the density of the flocs relative to the liquid. Otherwise, filtration may be employed as a means to separate the larger flocs.

The additives described above, and especially flocculants, are often employed, for example, in the separation of solid particles of rock or drill cuttings from oil and gas well drilling fluids. These drilling fluids (often referred to as "drilling muds") are important in the drilling process for several reasons, including cooling and lubricating the drill bit, establishing a fluid counterpressure to prevent high-pressure oil, gas, and/or water formation fluids from entering the well prematurely, and hindering the collapse of the uncased wellbore. Drilling muds, whether water- or oil-based, also remove drill cuttings from the drilling area and transport them to the surface. Flocculants such as acrylic polymers are commonly used to agglomerate these cuttings at the surface of the circulating drilling mud, where they can be separated from the drilling mud.

Other uses for flocculants in solid/liquid separations include the agglomeration of clays which are suspended in the large waste slurry effluents from phosphate production facilities. Flocculants such as anionic natural or synthetic polymers, which may be combined with a fibrous material such as recycled newspaper, are often used for this purpose. The aqueous clay slurries formed in phosphate purification plants typically have a flow rate of over 100,000 gallons per minute and generally contain less than 5% solids by weight. The dewatering (or settling) of this waste clay, which allows for recycle of the water, presents one of the most difficult problems associated with reclamation. The settling ponds used for this dewatering normally make up about half of the mined area, and dewatering time can be on the order of several months to several years.

In the separation of solids from aqueous liquids, other specific applications of industrial importance include the filtration of coal from water-containing slurries (i.e., coal slurry dewatering), the processing of sewage to remove contaminants (e.g., sludge) via sedimentation, and the processing of pulp and paper mill effluents to remove suspended cellulosic solids. The dewatering of coal poses a significant problem industrially, as the BTU value of coal decreases with increasing water content. Raw sewage, both industrial and municipal, requires enormous processing capacity, as wastes generated by the U.S. population, for example, are collected into sewer systems and carried along by approximately 14 billion gallons of water per day. Paper industry effluent streams likewise represent large volumes of solid-containing aqueous liquids, as waste water generated from a typical paper plant often exceeds 25 million gallons per day. The removal of sand from aqueous bitumen-containing slurries generated in the extraction and subsequent processing of oil sands, as described previously, poses another commercially significant challenge in the purification of aqueous liquid suspensions. Also, the removal of suspended solid particulates is often an important consideration in the purification of water, such as in the preparation of drinking (i.e., potable) water. Synthetic polyacrylamides, as well as naturally-occurring hydrocolloidal polysaccharides such as alginates (copolymers of D-mannuronic and L-guluronic acids) and guar gum are conventional flocculants in this service.

The above applications therefore provide several specific examples relating to the purification of aqueous liquid suspensions to remove solid particulates. However, such separations are common in a vast number of other processes in the mineral, chemical, industrial and municipal waste; sewage processing; and paper industries, as well as in a wide variety of other water-consuming industries. Thus, there is a need in the art for additives that can effectively promote selective separation of a wide variety of solid contaminants from liquid suspensions. Advantageously, such agents should be selective in chemically interacting with the solid contaminants, through coagulation, flocculation, or other mechanisms such that the removal of these contaminants is easily effected. Especially desirable are additives that are also able to complex unwanted ionic species such as metal cations to facilitate their removal as well.

SUMMARY OF THE INVENTION

All Uses

The present invention is directed to modified resins for removing, generally in a selective fashion, a wide variety of solids and/or ionic species from the liquids in which they are suspended and/or dissolved. These modified resins are especially useful as froth flotation depressants in the beneficiation of many types of materials including mineral and metal ores, such as in the beneficiation of kaolin clay. The modified resins are also useful for treating aqueous liquid suspensions (e.g., aqueous suspensions containing sand, clay, coal, and/or other solids, such as used drill cutting fluids, as well as process and effluent streams in phosphate and coal production, sewage treatment, paper manufacturing, or bitumen recovery facilities) to facilitate the removal of solid particulates and also potentially metallic cations (e.g., in the purification of drinking water) using a number of possible separation processes. The modified resins comprise a base resin that is modified with a coupling agent. The coupling agent is highly selective for binding to solid contaminants and especially siliceous materials such as sand or clay.

Froth Flotation

Without being bound by theory, the coupling agent is highly selective in froth flotation separations for binding to either gangue or desired (e.g., kaolin clay) materials and especially siliceous gangue materials such as sand or clay. Also, because the base resin has affinity for water, the materials which interact and associate with the coupling agent, are effectively sequestered in the aqueous phase in froth flotation processes. Consequently, the gangue materials can be selectively separated from the value materials (e.g., minerals, metals, or bitumen) or clay-containing ore impurities (e.g., iron and titanium oxides) that are isolated in the froth concentrate.

Accordingly, in one embodiment, the present invention is a method for beneficiation of an ore. The method comprises treating a slurry of ore particles with a depressant comprising a modified resin (i.e., a modified amine-aldehyde resin). The modified resin comprises a base resin that is the reaction product of a primary or a secondary amine and an aldehyde, and the base resin is modified with a coupling agent. The ore slurry treatment may occur before or during froth flotation. In another embodiment, when ore slurry treatment occurs before froth flotation, the treating step comprises combining the slurry of the ore and the depressant, followed by froth flotation of the slurry of the ore and depressant. In another embodiment, the treating step further comprises, after the combining step and prior to froth flotation, conditioning the slurry. The conditioning step may be carried out in a conditioning vessel for a conditioning time from about 30 seconds to about 10 minutes, at a conditioning temperature from about 1° C. to about 95° C., and at a conditioning pH of at least about 2.0. In another embodiment, the beneficiation method purifies and recovers, from the ore, a value mineral or metal selected from the group consisting of phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, and borate. In another embodiment, the ore comprises an impurity selected from the group consisting of sand, clay, an iron oxide, a titanium oxide, iron-bearing titania, mica, ilmenite, tourmaline, an aluminum silicate, calcite, dolomite, anhydrite, ferromagnesian, feldspar, calcium magnesium carbonate, igneous rock, soil, and mixtures thereof. Often, the impurities are sand or clay impurities, as are typically extracted with phosphate or potassium ores. In another embodiment, however, mercury is an impurity of an ore comprising coal or synthetic gypsum, which is treated with the modified resin prior to or during a froth flotation step. The coal or synthetic gypsum has an initial amount of total mercury and the beneficiation purifies and recovers, from the ore, purified coal or purified synthetic gypsum having a final amount of total mercury that is less than the initial amount of total mercury, wherein the initial and final amounts of total mercury are measured on a volatile free basis. In another embodiment, the final amount of total mercury is less than about 10 ppb on a volatile free basis. In another embodiment, the synthetic gypsum is formed during desulfurization of flue gas from a coal-burning power plant. In another embodiment, the depressant comprises the modified resin and a chelating agent. In another embodiment, the ore comprises an impure coal ore, the treating step is prior to or during a froth flotation step, and the beneficiation purifies and recovers, from the impure coal ore, purified coal having, relative to the impure coal ore, a reduced amount of an impurity selected from the group consisting of nitrogen, sulfur, silicon, ash, and pyrite, wherein the impurity is measured on a volatile free weight basis. In another embodiment, the ore comprises an impure coal ore, the treating step is prior to or during a froth flotation step, and the beneficiation purifies and recovers, from the impure coal ore, purified coal having, relative to the impure coal ore, a reduced amount of moisture and/or an increased BTU value per unit weight.

In another embodiment, the base resin is a urea-formaldehyde resin. In another embodiment, the coupling agent is selected from the group consisting of a substituted silane, a silicate, silica, a polysiloxane, and mixtures thereof.

In another embodiment, the present invention is a froth flotation depressant for beneficiation of value materials, including minerals or value metal ores. The depressant comprises a modified resin in a solution or dispersion having a resin solids content from about 0.1% to about 90% by weight, often from about 30% to about 90% by weight. In another embodiment, the resin solids content may be greater than about 90% by weight, and the modified resin may be employed in forms such as a solid powder, prill, lump, flake, or a melt. The modified resin comprises a base resin that is the reaction product of a primary or secondary amine and an aldehyde. The base resin is modified with a coupling agent. The coupling agent is present in an amount representing from about 0.1% to about 2.5% of the weight of the solution or dispersion, having a resin solids content from about 30% to about 90% by weight. In another embodiment, the base resin is a urea-formaldehyde resin that is the reaction product of urea and formaldehyde at a formaldehyde : urea (F:U) molar ratio from about 1.75:1 to about 3:1. In another embodiment, the base resin comprises a urea-formaldehyde resin having a number average molecular weight ($M_n$) of greater than about 100 grams/mole, and often from about 400 to about 4000 grams/mole. In another embodiment, the coupling agent is a substituted silane selected from the group consisting of a ureido substituted silane, an amino substituted silane, a sulfur substituted silane, an epoxy substituted silane, a methacryl substituted silane, a vinyl substituted silane, an alkyl substituted silane, and a haloalkyl substituted silane.

In another embodiment, the present invention is a method for purifying clay from a clay-containing ore comprising an impurity selected from a metal, a metal oxide, a mineral, and mixtures thereof. The method comprises treating a slurry of the clay-containing ore with a depressant comprising a modified resin and recovering, by froth flotation of the impurity either after or during the treating step, a purified clay having a reduced amount at least one of the impurities. The modified resin comprises a base resin that is the reaction product of a primary or a secondary amine and an aldehyde. The base resin is modified with a coupling agent. In another embodiment, the clay-containing ore comprises kaolin clay. In another embodiment, the impurity comprises a mixture of iron oxide and titanium dioxide. In another embodiment, the impurity comprises coal.

In another embodiment, the present invention is a method for purifying bitumen from a bitumen-containing slurry comprising sand or clay. The method comprises treating the slurry with a depressant comprising the modified resin described above and recovering, by froth flotation either after or during the treating step, purified bitumen having a reduced amount of sand or clay.

Other Separations

In another embodiment, the present invention is a method for purifying an aqueous liquid suspension comprising a solid contaminant. The method comprises treating the liquid suspension with a modified resin as described above and removing, either after or during the treating step, (1) at least a portion of the solid contaminant in a contaminant-rich fraction and/or (2) a purified liquid. In another embodiment, the treating step comprises flocculating the solid contaminant (e.g., sand or clay). In another embodiment, the removing step is carried out by sedimentation, flotation, or filtration. In another embodiment, the liquid suspension is an oil well drilling fluid and the method comprises removing a purified drilling fluid for reuse in oil well drilling. In another embodiment, the aqueous liquid suspension is a clay-containing effluent slurry from a phosphate production facility and the method comprises removing purified water for reuse in phosphate production. In another embodiment, the aqueous liquid suspension is an aqueous coal-containing suspension and the method comprises removing a coal-rich fraction by filtration. In another embodiment, the aqueous liquid suspension comprises sewage and the method comprises removing purified water by sedimentation. In another embodiment, the aqueous liquid suspension comprises a pulp or paper mill effluent, the solid contaminant comprises a cellulosic material, and the method comprises removing purified water. In another embodiment, the aqueous liquid suspension is a bitumen production process intermediate or effluent slurry comprising sand or clay. In still another embodiment, the purified liquid is potable water.

In another embodiment, the present invention is a method for purifying coal ore. The method comprises treating an aqueous slurry of the coal ore with a depressant prior to or during a size or density classification operation which recovers purified coal having, relative to the coal ore, a reduced amount of an impurity selected from the group consisting of mercury, nitrogen, sulfur, silicon, ash, and pyrite, wherein the impurity is measured on a volatile free basis. The depressant comprises a modified resin as described herein. In another embodiment, the purified coal has, relative to the coal ore, a reduced amount of moisture and/or an increased BTU value per unit weight. In another embodiment, the purified coal has, relative to the coal ore, a reduced amount of all impurities selected from the group consisting of mercury, nitrogen, sulfur, silicon, ash, and pyrite. In another embodiment, the reduced amount is less than an amount in a purified reference coal recovered in the size classification operation, but without treating the aqueous slurry with the depressant. In another embodiment, the size or density classification operation is selected from the group consisting of a cyclone separation, a heavy medium separation, filtration, screening, and combinations thereof.

In another embodiment, the present invention is a method for purifying water comprising a metallic cation. The method comprises treating the water with the modified resin described above and removing at least a portion of the metallic cation by filtration to yield purified water (e.g., potable water). In another embodiment, the removing step comprises membrane filtration. In another embodiment, the metallic cation is selected from the group consisting of $As^{+5}$, $Pb^{+2}$, $Cd^{+2}$, $Cu^{+2}$, $Mn^{+2}$, $Hg^{+2}$, $Zn^{+2}$, $Fe^{+2}$, and mixtures thereof. In yet another embodiment, the base resin is further modified with an anionic functional group.

These and other embodiments are apparent from the following Detailed Description.

DETAILED DESCRIPTION OF THE INVENTION

All Uses

Figure 1:
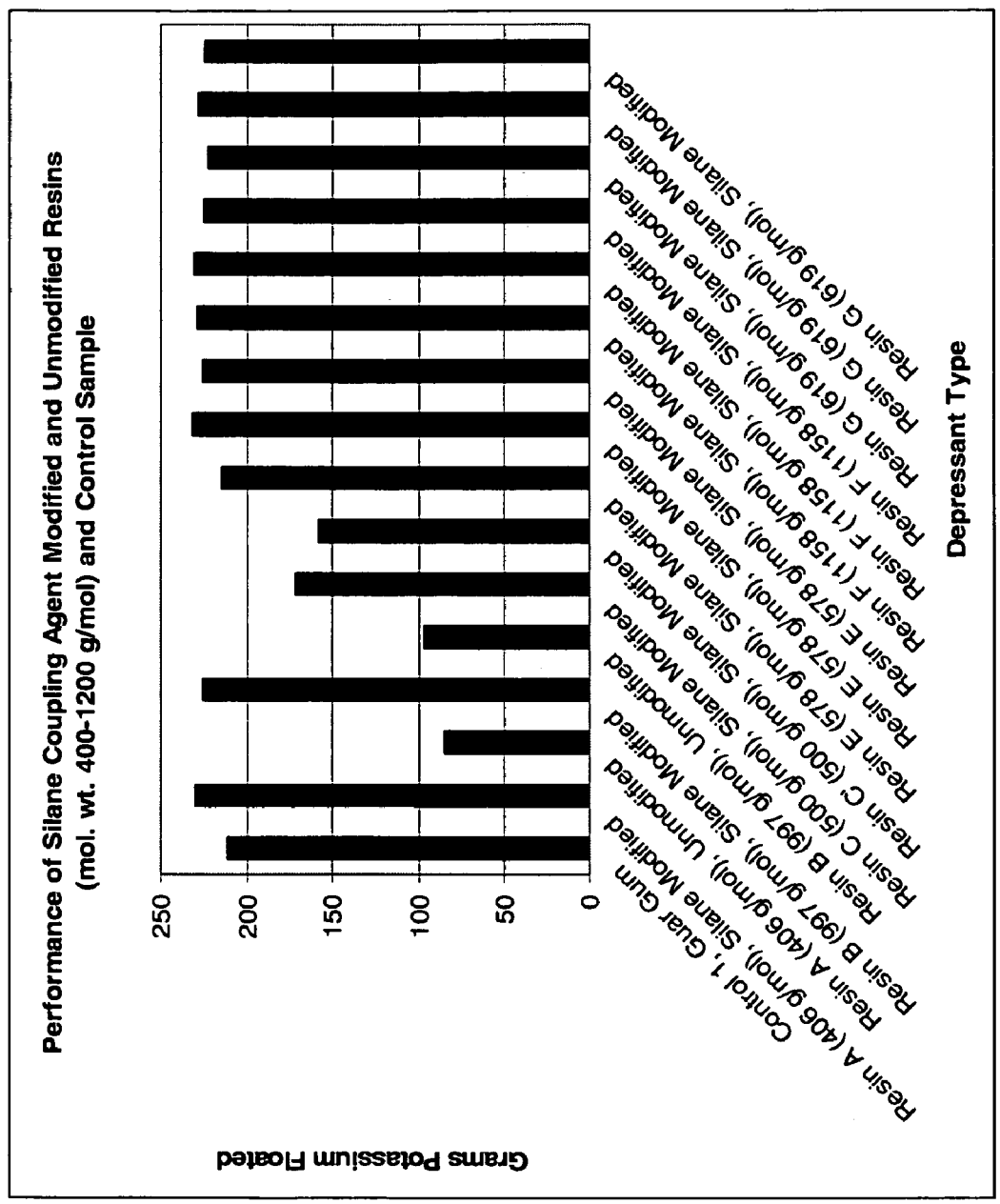
FIG. 1 illustrates the performance, in the flotation of a sample of ground potassium ore, of silane coupling agent-modified urea-formaldehyde resins having a molecular weight within the range of 400-1200 grams/mole. The performance is shown relative to unmodified resins (i.e., without an added silane coupling agent) and also relative to a guar gum control sample.

The modified resin that is used in separation processes of the present invention comprises a base resin that is the reaction product of a primary or secondary amine and an aldehyde. The primary or secondary amine, by virtue of having a nitrogen atom that is not completely substituted (i.e., that is not part of a tertiary or quaternary amine) is capable of reacting with an aldehyde, to form an adduct. If formaldehyde is used as the aldehyde, for example, the adduct is a methylolated adduct having reactive methylol functionalities. For purposes of the present invention, representative primary and secondary amines used to form the base resin include compounds having at least two functional amine or amide groups, or amidine compounds having at least one of each of these groups. Such compounds include ureas, guanidines, and melamines, which may be substituted at their respective amine nitrogen atoms with aliphatic or aromatic radicals, wherein at least two nitrogen atoms are not completely substituted. Primary amines are often used. Representative of these is urea, which has a low cost and is extensively available commercially. In the case of urea, if desired, at least a portion thereof can be replaced with ammonia, primary alkylamines, alkanolamines, polyamines (e.g., alkyl primary diamines such as ethylene diamine and alkyl primary triamines such as diethylene triamine), polyalkanolamines, melamine or other amine-substituted triazines, dicyandiamide, substituted or cyclic ureas (e.g., ethylene urea), primary amines, secondary amines and alkylamines, tertiary amines and alkylamines, guanidine, and guanidine derivatives (e.g., cyanoguanidine and acetoguanidine). Aluminum sulfate, cyclic phosphates and cyclic phosphate esters, formic acid or other organic acids may also be used in conjunction with urea. The amount of any one of these components (or if used in combination then their combined amount), if incorporated into the resin to replace part of the urea, typically will vary from about 0.05 to about 20% by weight of the resin solids. These types of agents promote hydrolysis resistance, flexibility, reduced aldehyde emissions and other characteristics, as is appreciated by those having skill in the art.

The aldehyde used to react with the primary or secondary amine as described above, to form the base resin, may be formaldehyde, or other aliphatic aldehydes such as acetaldehyde and propionaldehyde. Aldehydes also include aromatic aldehydes (e.g., benzylaldehyde and furfural), and other aldehydes such as aldol, glyoxal, and crotonaldehyde. Mixtures of aldehydes may also be used. Generally, due to its commercial availability and relatively low cost, formaldehyde is used.

In forming the base resin, the initial formation of an adduct between the amine and the aldehyde is well known in the art. The rate of the aldehyde addition reaction is generally highly dependent on pH and the degree of substitution achieved. For example, the rate of addition of formaldehyde to urea to form successively one, two, and three methylol groups has been estimated to be in the ratio of 9:3:1, while tetramethylolurea is normally not produced in a significant quantity. The adduct formation reaction typically proceeds at a favorable rate under alkaline conditions and thus in the presence of a suitable alkaline catalyst (e.g., ammonia, alkali metal hydroxides, or alkaline earth metal hydroxides). Sodium hydroxide is most widely used.

At sufficiently high pH values, it is possible for the adduct formation reaction to proceed essentially in the absence of condensation reactions that increase the resin molecular weight by polymerization (i.e., that advance the resin). However, for the formation of low molecular weight condensate resins from the further reaction of the amine-aldehyde adduct, the reaction mixture is generally maintained at a pH of greater than about 5 and typically from about 5 to about 9. If desired, an acid such as acetic acid can be added to help control the pH and therefore the rate of condensation and ultimately the molecular weight of the condensed resin. The reaction temperature is normally in the range from about 30° C. to about 120° C., typically less than about 85° C., and often the reflux temperature is used. A reaction time from about from about 15 minutes to about 3 hours, and typically from about 30 minutes to about 2 hours, is used in preparing the low molecular weight amine-aldehyde condensate resin from the primary or secondary amine and aldehyde starting materials.

Various additives may be incorporated, prior to or during the condensation reaction, in order to impart desired properties into the final modified amine-aldehyde resin. For example, guar gum; carboxymethylcellulose or other polysaccharides such as alginates; or polyols such as polyvinyl alcohols, pentaerythitol, or Jeffol™ polyols (Hunstman Corporation, Salt Lake City, Utah, USA) may be used to alter the viscosity and consistency of the amine-aldehyde resin condensate, which when used to prepare the modified amine-aldehyde resin, can improve its performance in froth flotation and other applications. Otherwise, quaternary ammonium salts including diallyl dimethyl ammonium chloride (or analogs such as diallyl diethyl ammonium chloride) or alkylating agents including epichlorohydrin (or analogs such as epibromohydrin) may be used to increase the cationic charge of the amine-aldehyde resin condensate, which when used to prepare the modified amine-aldehyde resin, can improve its performance in certain solid/liquid separations (e.g., clay dewatering) discussed below. In this manner, such additives may be more effectively reacted into the modified amine-aldehyde resin than merely blended with the resin after its preparation.

Condensation reaction products of the amine-aldehyde, amide-aldehyde, and/or amidine-aldehyde adducts described above include, for example those products resulting from the formation of (i) methylene bridges between amido nitrogens by the reaction of alkylol and amino groups, (ii) methylene ether linkages by the reaction of two alkylol groups, (iii) methylene linkages from methylene ether linkages with the subsequent removal of formaldehyde, and (iv) methylene linkages from alkylol groups with the subsequent removal of water and formaldehyde.

Generally, in preparing the base resin, the molar ratio of aldehyde:primary or secondary amine is from about 1.5:1 to about 4:1, which refers to the ratio of moles of all aldehydes to moles of all amines, amides, and amidines reacted to prepare the base resin during the course of the adduct formation and condensation reactions described above, whether performed separately or simultaneously. The resin is normally prepared under ambient pressure. The viscosity of the reaction mixture is often used as a convenient proxy for the resin molecular weight. Therefore the condensation reaction can be stopped when a desired viscosity is achieved after a sufficiently long time and at a sufficiently high temperature. At this point, the reaction mixture can be cooled and neutralized. Water may be removed by vacuum distillation to give a resin with a desired solids content. Any of a wide variety of conventional procedures used for reacting primary and secondary amine and aldehyde components can be used, such as staged monomer addition, staged catalyst addition, pH control, amine modification, etc., and the present invention is not limited to any particular procedure.

A representative base resin for use in separation processes of the present invention is a urea-formaldehdye resin. As described above, a portion of the urea may be replaced by other reactive amine and/or amides and a portion of the formaldehyde may be replaced by other aldehydes, to provide various desirable properties, without departing from the characterization of the base resin as a urea-formaldehyde resin. Urea-formaldehyde resins, when used as the base resin, can be prepared from urea and formaldehyde monomers or from precondensates in manners well known to those skilled in the art. Generally, the urea and formaldehyde are reacted at a molar ratio of formaldehyde to urea (F:U) in the range from about 1.75:1 to about 3:1, and typically at a formaldehyde:urea (F:U) mole ratio from about 2:1 to about 3:1, in order to provide sufficient methylolated species for resin cross-linking (e.g., di- and tri-methylolated ureas). Generally, the urea-formaldehyde resin is a highly water dilutable dispersion, if not an aqueous solution.

In various embodiments, the condensation is allowed to proceed to an extent such that the urea-formaldehyde base resin has a number average molecular weight ($M_n$), of greater than about 100 grams/mole, and often greater than about 300 grams/mole. Good results in separation processes have been achieved with urea-formaldehyde base resin molecular weights in the range from about 400 to about 4000 grams/mole and also in the range from about 400 to about 1200 grams/mole. As is known in the art, the value of $M_n$ of a polymer sample having a distribution of molecular weights is defined as $$M_n = \frac{\sum_i N_i M_i}{\sum_i N_i},$$

where $N_i$ is the number of polymer species having i repeat units and $M_i$ is the molecular weight of the polymer species having i repeat units. The number average molecular weight is typically determined using gel permeation chromatography (GPC), using solvent, standards, and procedures well known to those skilled in the art.

A cyclic urea-formaldehyde resin may also be employed and prepared, for example, according to procedures described in U.S. Pat. No. 6,114,491. Urea, formaldehyde, and ammonia reactants are used in a mole ratio of urea:formaldehyde:ammonia that may be about 0.1 to 1.0:about 0.1 to 3.0:about 0.1 to 1.0. These reactants are charged to a reaction vessel while maintaining the temperature below about 70° C. (160° F.), often about 60° C. (140° F.). The order of addition is not critical, but it is important to take care during the addition of ammonia to formaldehyde (or formaldehyde to ammonia), due to the exothermic reaction. In fact, due to the strong exotherm, it may be preferred to charge the formaldehyde and the urea first, followed by the ammonia. This sequence of addition allows one to take advantage of the endotherm caused by the addition of urea to water to increase the rate of ammonia addition. A base may be required to maintain an alkaline condition throughout the cook.

Once all the reactants are in the reaction vessel, the resulting solution is heated at an alkaline pH to between about 60 and 105° C. (about 140 to about 220° F.), often about 85 to 95° C. (about 185 to 205° F.), for 30 minutes to 3 hours, depending on mole ratio and temperature, or until the reaction is complete. Once the reaction is complete, the solution is cooled to room temperature for storage. The resulting solution is storage stable for several months at ambient conditions. The pH is between 5 and 11.

The yield is usually about 100%. The cyclic urea resins often contain at least 20% triazone and substituted triazone compounds. The ratio of cyclic ureas to di- and tri- substituted ureas and mono-substituted ureas varies with the mole ratio of the reactants. For example, a cyclic urea resin having the mole ratio of 1.0:2.0:0.5 U:F:A resulted in a solution characterized by $C^{13}$-NMR and containing approximately 42.1% cyclic ureas, 28.5% di/tri-substituted ureas, 24.5% mono-substituted ureas, and 4.9% free urea. A cyclic urea resin having the mole ratio of 1.0:1.2:0.5 U:F:A resulted in a solution characterized by $C^{13}$-NMR and containing approximately 25.7% cyclic ureas, 7.2% di/tri-substituted ureas, 31.9% mono-substituted ureas, and 35.2 free urea.

In addition, the cyclic urea-formaldehyde resin may be prepared by a method such as described in U.S. Pat. No. 5,674,971. The cyclic urea resin is prepared by reacting urea and formaldehyde in at least a two step and optionally a three-step process. In the first step, conducted under alkaline reaction conditions, urea and formaldehyde are reacted in the presence of ammonia, at an F/U mole ratio of between about 1.2:1 and 1.8:1. The ammonia is supplied in an amount sufficient to yield an ammonia/urea mole ratio of between about 0.05:1 and 1.2:1. The mixture is reacted to form a cyclic triazone/triazine or cyclic urea resin.

Water soluble triazone compounds may also be prepared by reacting urea, formaldehyde and a primary amine as described in U.S. Pat. Nos. 2,641,584 and 4,778,510. These patents also describe suitable primary amines such as, but are not limited to, alkyl amines such as methyl amine, ethyl amine, and propyl amine, lower hydroxyamines such as ethanolamine cycloalkylmonoamines such as cyclopentylamine, ethylenediamine, hexamethylenediamine, and linear polyamines. The primary amine may be substituted or unsubstituted.

In the case of a cyclic urea-formaldehyde or a urea-formaldehyde resin, skilled practitioners recognize that the urea and formaldehyde reactants are commercially available in many forms. Any form which is sufficiently reactive and which does not introduce extraneous moieties deleterious to the desired reactions and reaction products can be used in the preparation of urea-formaldehyde resins useful in the invention. For example, commonly used forms of formaldehyde include paraform (solid, polymerized formaldehyde) and formalin solutions (aqueous solutions of formaldehyde, sometimes with methanol, in 37 percent, 44 percent, or 50 percent formaldehyde concentrations). Formaldehyde also is available as a gas. Any of these forms is suitable for use in preparing a urea-formaldehyde base resin. Typically, formalin solutions are used as the formaldehyde source. To prepare the base resin of the present invention, formaldehyde may be substituted in whole or in part with any of the aldehydes described above (e.g., glyoxal).

Similarly, urea is commonly available in a variety of forms. Solid urea, such as prill, and urea solutions, typically aqueous solutions, are commercially available. Any form of urea is suitable for use in the practice of the invention. For example, many commercially prepared urea-formaldehyde solutions may be used, including combined urea-formaldehyde products such as Urea-Formaldehyde Concentrate (e.g., UFC 85) as disclosed in U.S. Pat. Nos. 5,362,842 and 5,389,716.

Also, urea-formaldehyde resins such as the types sold by Georgia Pacific Resins, Inc., Borden Chemical Co., and Neste Resins Corporation may be used. These resins are prepared as either low molecular weight condensates or as adducts which, as described above, contain reactive methylol groups that can undergo condensation to form resin polymers, typically within the number average molecular weight ranges described previously. The resins will generally contain small amounts of unreacted (i.e., free) urea and formaldehyde, as well as cyclic ureas, mono-methylolated urea, and di- and tri-methylolated ureas. The relative quantities of these species can vary, depending on the preparation conditions (e.g., the molar formaldehyde:urea ratio used). The balance of these resins is generally water, ammonia, and formaldehyde. Various additives known in the art, including stabilizers, cure promoters, fillers, extenders, etc., may also be added to the base resin.

Modified resins of the present invention are prepared by modifying the base resin, as described above, with a coupling agent that is highly selective for binding with unwanted solid materials (e.g., sand or clay) and/or ionic species such as metallic cations to be separated in the separation/purification processes of the present invention. Without being bound by theory, the coupling agent is believed to improve the ability of the base resin, which, in one embodiment, is generally cationic (i.e., carries more overall positive than negative charge) to attract most clay surfaces, which are generally anionic (i.e., carry more overall negative than positive charge). These differences in electronic characteristics between the base resin and clay can result in mutual attraction at multiple sites and even the potential sharing of electrons to form covalent bonds. The positive-negative charge interactions which cause clay particles to become attracted to the base resin is potentially explained by several theories, such as host-guest theory (including podands), hard-soft acid base theory, dipole-dipole interactions, and Highest Occupied Molecular Orbital-Lowest unoccupied Molecular Orbital (HOMO-LUMO) interactions, hydrogen bonding, Gibbs free energy of bonding, etc.

The coupling agent may be added before, during, or after the adduct-forming reaction, as described above, between the primary or secondary amine and the aldehyde. For example, the coupling agent may be added after an amine-aldehyde adduct is formed under alkaline conditions, but prior to reducing the pH of the adduct (e.g., by addition of an acid) to effect condensation reactions. Normally, the coupling agent is covalently bonded to the base resin by reaction between a base resin-reactive functional group of the coupling agent and a moiety of the base resin.

The coupling agent may also be added after the condensation reactions that yield a low molecular weight polymer. For example, the coupling agent may be added after increasing the pH of the condensate (e.g., by addition of a base) to halt condensation reactions. Advantageously, it has been found that the base resin may be sufficiently modified by introducing the coupling agent to the resin condensate at an alkaline pH (i.e., above pH 7), without appreciably advancing the resin molecular weight. Typically, the resin condensate is in the form of an aqueous solution or dispersion of the resin. When substituted silanes are used as coupling agents, they can effectively modify the base resin under alkaline conditions and at either ambient or elevated temperatures. Any temperature associated with adduct formation or condensate formation during the preparation of the base resin, as described above, is suitable for incorporation of the coupling agent to modify the base resin. Thus, the coupling agent may be added to the amine-aldehyde mixture, adduct, or condensate at a temperature ranging from ambient to about 100° C. Generally, an elevated temperature from about 35° C. to about 45° C. is used to achieve a desirable rate of reaction, for example, between the base resin-reactive group of the substituted silane and the base resin itself. As with the resin condensation reactions described previously, the extent of this reaction may be monitored by the increase in the viscosity of the resin solution or dispersion over time.

Alternatively, in some cases a silane coupling agent may be added to the liquid that is to be purified (e.g., the froth flotation slurry) and that contains the base resin, in order to modify the base resin in situ.

Representative coupling agents that can modify the base resin of the present invention and that also have the desired binding selectivity or affinity for impurities such as sand, clay, and/or ionic species include substituted silanes, which posses both a base resin-reactive group (e.g., an organofunctional group) and a second group (e.g., a trimethoxysilane group) that is capable of adhering to, or interacting with, unwanted impurities (especially siliceous materials). Without being bound by theory, the second group may effect the agglomeration of these impurities into larger particles or flocs (i.e., by flocculation), upon treatment with the modified resin. This facilitates their removal. In the case of ore froth flotation separations, this second group of the coupling agent promotes the sequestering of either gangue impurities or desired materials (e.g., kaolin clay) in the aqueous phase, in which the base resin is soluble or for which the base resin has a high affinity. This improves the separation of value materials from the aqueous phase by flotation with a gas such as air.

Representative base resin-reactive groups of the silane coupling agents include, but are not limited to, ureido-containing moieties (e.g., ureidoalkyl groups), amino-containing moieties (e.g., aminoalkyl groups), sulfur-containing moieties (e.g., mercaptoalkyl groups), epoxy-containing moieties (e.g., glycidoxyalkyl groups), methacryl-containing moieties (e.g., methacryloxyalkyl groups), vinyl-containing moieties (e.g., vinylbenzylamino groups), alkyl-containing moieties (e.g., methyl groups), or haloalkyl-containing moieties (e.g., chloroalkyl groups). Representative substituted silane coupling agents of the present invention therefore include ureido substituted silanes, amino substituted silanes, sulfur substituted silanes, epoxy substituted silanes, methacryl substituted silanes, vinyl substituted silanes, alkyl substituted silanes, and haloalkyl substituted silanes.

It is also possible for the silane coupling agent to be substituted with more than one base-resin reactive group. For example, the tetravalent silicon atom of the silane coupling agent may be independently substituted with two or three of the base-resin reactive groups described above. As an alternative to, or in addition to, substitution with multiple base-resin reactive groups, the silane coupling agent may also have multiple silane functionalities, to improve the strength or capacity of the coupling agent in bonding with either gangue impurities such as sand or desired materials such as kaolin clay. The degree of silylation of the silane coupling agent can be increased, for example, by incorporating additional silane groups into coupling agent or by cross-linking the coupling agent with additional silane-containing moieties. The use of multiple silane functionalities may even result in a different orientation between the coupling agent and clay surface (e.g., affinity between the clay surface and multiple silane groups at the "side" of the coupling agent, versus affinity between a single silane group at the "head" of the coupling agent).

The silane coupling agents also comprise a second group, as described above, which includes the silane portion of the molecule, that is typically substituted with one or more groups selected from alkoxy (e.g., trimethoxy), acyloxy (e.g., acetoxy), alkoxyalkoxy (e.g., methoxyethoxy), aryloxy (e.g., phenoxy), aroyloxy (e.g., benzoyloxy), heteroaryloxy (e.g., furfuroxy), haloaryloxy (e.g., chlorophenoxy), heterocycloalkyloxy (e.g., tetrahydrofirfuroxy), and the like. Representative silane coupling agents, having both base resin-reactive groups and second groups (e.g., gangue-reactive groups) as described above, for use in modifying the base resin, therefore include ureidopropyltrimethoxysilane, ureidopropyltriethoxysilane, aminopropyltrimethoxysilane, aminopropyltriethoxysilane, aminopropylmethyldiethoxysilane, aminopropylmethyldimethoxysilane, aminoethylaminopropyltrimethoxysilane, aminoethylaminopropyltriethoxysilane, aminoethylaminopropylmethyldimethoxysilane, diethylenetriaminopropyltrimethoxysilane, diethylenetriaminopropyltriethoxysilane, diethylenetriaminopropylmethyldimethoxysilane, diethylenetriaminopropylmethyldiethoxysilane, cyclohexylaminopropyltrimethoxysilane, hexanediaminomethyltriethoxysilane, anilinomethyltrimethoxysilane, anilinomethyltriethoxysilane, diethylaminomethyltriethoxysilane, (diethylaminomethyl)methyldiethoxysilane, methylaminopropyltrimethoxysilane, bis(triethoxysilylpropyl)tetrasulfide, bis(triethoxysilylpropyl)

disulfide, mercaptopropyltrimethoxysilane, mercaptopropyltriethoxysilane, mercaptopropylmethyldimethoxysilane, 3-thiocyanatopropyltriethoxysilane, isocyanatopropyl triethylsilane, glycidoxypropyltrimethoxysilane, glycidoxypropyltriethoxysilane, glycidoxypropylmethyldiethoxysilane, glycidoxypropylmethyldimethoxysilane, methacryloxypropyltrimethoxysilane, methacryloxypropyltriethoxysilane, methacryloxypropylmethyldimethoxysilane, chloropropyltrimethoxysilane, chloropropyltriethoxysilane, chloromethyltriethoxysilane, chloromethyltrimethoxysilane, dichloromethyltriethoxysilane, vinyltrimethoxysilane, vinyltriethoxysilane, vinyltris(2-methoxyethoxy)silane, vinyltriacetoxysilane, alkylmethyltrimethoxysilane, vinylbenzylaminotrimethoxysilane, (3,4-epoxycyclohexyl) ethyltrimethoxysilane, aminopropyltriphenoxysilane, aminopropyltribenzoyloxysilane, aminopropyltrifurfuroxysilane, aminopropyltri(o-chlorophenoxy)silane, aminopropyltri(p-chlorophenoxy)silane, aminopropyltri(tetrahydrofurfuroxy)silane, ureidosilane, mercaptoethyltriethoxysilane, and vinyltrichlorosilane, methacryloxypropyltri(2-methoxyethoxy)silane.

Other representative silane coupling agents include oligomeric aminoalkylsilanes having, as a base resin-reactive group, two or more repeating aminoalkyl or alkylamino groups bonded in succession. An example of an oligomeric aminoalkylsilane is the solution Silane A1106, available under the trade name Silquest (GE Silicones-OSi Specialties, Wilton, Conn., USA), which is believed to have the general formula $(NH_2CH_2CH_2CH_2SiO_{1.5})_n$, wherein n is from 1 to about 3. Modified aminosilanes such as a triaminosilane solution (e.g., Silane A1128, available under the same trade name and from the same supplier) may also be employed.

Other representative silane coupling agents are the ureido substituted and amino substituted silanes as described above. Specific examples of these are ureidopropyltrimethoxysilane, ureidopropyltriethoxysilane, aminopropyltrimethoxysilane, and aminopropyltriethoxysilane.

Polysiloxanes and polysiloxane derivatives may also be used as coupling agents, as described above, to enhance the performance of the modified base resin in solid/liquid separations. Polysiloxane derivatives include those polyorganosiloxanes obtained from the blending of organic resins with polysiloxane resins to incorporate various functionalities therein, including urethane, acrylate, epoxy, vinyl, and alkyl functionalities.

Silica and/or silicates may be used in conjunction (e.g., added as a blending component) with the modified resin of the present invention to potentially improve its affinity for either gangue impurities or desired materials (e.g., kaolin clay), especially siliceous materials including sand and clay. Other agents that may be used to improve the performance of modified resins in the separation processes of the present invention include polysaccharides, polyvinyl alcohol, polyacrylamide, as well as known flocculants (e.g., alginates). These agents can likewise be used with modified urea-formaldehyde resins wherein, as described above, at least a portion of the urea is replaced with ammonia or an amine as described above (e.g., primary alkylamines, alkanolamines, polyamines, etc.). Otherwise, such agents can also be used with the modified resins, which are further modified with anionic functional groups (e.g., sulfonate) or stabilized by reaction with an alcohol (e.g., methanol), as described below.

Silica in the form of an aqueous silica sol, for example, is available from Akzo Nobel under the Registered Trademark "Bindzil" or from DuPont under the Registered Trademark "Ludox". Other grades of sol are available having various particle sizes of colloidal silica and containing various stabilizers. The sol can be stabilized by alkali, for example sodium, potassium, or lithium hydroxide or quaternary ammonium hydroxide, or by a water-soluble organic amine such as alkanolamine.

Silicates, such as alkali and alkaline earth metal silicates (e.g., lithium silicate, sodium-lithium silicate, potassium silicate, magnesium silicate, and calcium silicate), as well as ammonium silicate or a quaternary ammonium silicate, may also be used in the preparation of a modified resin. Additionally, stabilized colloidal silica-silicate blends or mixtures, as described in U.S. Pat. No. 4,902,442, are applicable.

In the separation processes of the present invention, particularly good performance has been found when preparing the modified resin using an amount of coupling agent representing from about 0.01% to about 5% of the weight of a solution or dispersion of the base resin, having a solids content from about 30% to about 90%, typically from about 45% to about 70%. In general, lower amounts of coupling agent addition do not achieve appreciable modification of the base resin, while higher amounts do not improve performance enough to justify the cost of the added coupling agent. When a mixture of coupling agents is used, the total weight of the mixture is normally within this range. An especially desired amount of added coupling agent is from about 0.1% to about 2.5% of the weight of a base resin solution or dispersion having a solids content within the range given above.

Alternatively, regardless of the solids content of the base resin solution or dispersion, the coupling agent is generally employed in an amount from about 0.01% to about 17%, and typically from about 0.1% to about 8.3%, of the weight of the base resin solids. These representative ranges of added coupling agent, based on the weight of the base resin itself, apply not only to resin solutions or dispersions, but also to "neat" forms of the modified base resin having little or no added solvent or dispersing agent (e.g., water). These ranges also generally apply when the basis is the combined weight of amine and aldehyde, as described previously, that is reacted to form the base resin. Generally, at least about 90% by weight, and typically at least about 95% by weight, of these amine and aldehyde components are reacted, in order to reduce the amounts of free, unreacted amine and aldehyde components, thereby more efficiently utilizing them in the production of the base resin polymer, and minimizing any deleterious effects (e.g., vaporization into the environment) associated with these components in their free form. As described previously, the modified resin may also be prepared by adding the coupling agent to the reaction mixture of amine and aldehyde used to form the base resin. The optimal amount of coupling agent is dependent on a number of factors, including the base resin solids content, the type of base resin and the particular coupling agent, the purity of the raw ore slurry to be beneficiated or liquid suspension to be purified, etc.

Modified amine-aldehyde resins for use in separation processes of the present invention may be employed in the form of a solution or dispersion having a resin solids content generally ranging from about 0.1% to about 90% by weight. Typical modified amine-aldehyde resins contain from about 40% to about 100% resin solids or non-volatiles, and often from about 55% to about 75% non-volatiles. Such resins may, however, be diluted to a lower solids content (e.g., below about 30% by weight), for example, using a brine solution together with a thickener such as poly(acrylic acid) for storage. The non-volatiles content is measured by the weight loss upon heating a small (e.g., 1-5 gram), sample of the composition at about 105° C. for about 3 hours. When an essentially "neat" form of the modified resin, having few or no volatile components, is employed, the pure resin may be added to the froth flotation slurry or liquid dispersion to be purified, such that an aqueous resin solution or dispersion is formed in situ. Neat forms of the modified amine-aldehyde resins may be obtained from solutions or dispersions of these resins using conventional drying techniques, for example spray drying. In some cases, a resin solids content of greater than about 90% by weight may be used. Forms of the modified amine-aldehyde resin at such high solids levels include viscous liquids, gels, melts, or solid forms including prill, lump, flake, or powders such as spray dried materials.

Aqueous solutions or dispersions of the modified resins of the present invention will generally be a clear liquid or a liquid having a white or yellow appearance. They will typically have a Brookfield viscosity from about 75 to about 500 cps and a pH from about 6.5 to about 9.5. The free formaldehyde content and free urea content of urea-formaldehyde resin solutions typically are each below 5%, and usually are each below 3%, and often are each below 1%. A low content of formaldehyde is generally achieved due to health concerns associated with exposure to formaldehyde emissions. If desired, conventional "formaldehyde scavengers" that are known to react with free formaldehyde may be added to reduce the level of formaldehyde in solution. Alternatively, the use of a silane coupling agent that is reactive with formaldehyde may also lower the free formaldehyde content to the levels indicated above. Such silane coupling agents which reduce free formaldehyde levels include amino substituted silanes and their sulfonated derivatives (sulfonated amine substituted silanes). Low amounts of free urea are also desirable, but for different reasons. Without being bound by theory, while free urea may itself become modified by a coupling agent (e.g., it may react with a substituted silane to improve its affinity for siliceous materials), free urea is not believed to have the requisite molecular weight, (1) in froth flotation separations, to "blind" either the gangue impurities or desired materials (e.g., kaolin clay) to their interaction with rising air bubbles, (2) in the purification of liquid dispersions, to agglomerate a sufficiently large number of solid contaminant particles into flocs, or (3) in the removal of ionic species from aqueous solutions, to bind these species to a molecule of sufficient size for retention by filtration. In particular, it has been found that resin polymers having a number average molecular weight of greater than about 100 grams/mole, and often greater than about 300 grams/mole exhibit the mass needed to promote efficient separations.

Froth Flotation

When used as depressants in froth flotation separations, modified resins of the present invention, due to their high selectivity, provide good results at economical addition levels. For example, the modified resins may be added in an amount from about 100 to about 1000 grams, and typically from about 400 to about 600 grams, based on resin solution or dispersion weight, per metric ton of material (e.g., clay-containing ore) that is to be purified by froth flotation. In general, the optimal addition amount for a particular separation can be readily ascertained by those of skill in the art in view of the present disclosure. This optimal addition amount depends on number of factors, including the type and amount of impurities.

Modified resins of the present invention can be applied in the froth flotation of a wide variety of value materials (e.g., minerals or metals such as phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, borate, or high molecular weight hydrocarbons such as bitumen). Often, the raw material to be purified and recovered contains sand or clay, for which the modified resin depressants described herein are especially selective.

Although clay is often considered an impurity in conventional metal or mineral ore beneficiation, it may also be present in relatively large quantities, as the main component to be recovered. Some clays, for example kaolin clay, are valuable minerals in a number of applications, such as mineral fillers in the manufacture of paper and rubber. Thus, one froth flotation process in which the modified resin of the present invention is employed involves the separation of clay from a clay-containing ore. The impurities in such ores are generally metals and their oxides, such as iron oxide and titanium dioxide, which are preferentially floated via froth flotation. Other impurities of clay-containing ores include coal. Impurities originally present in most Georgia kaolin, which are preferentially floated in the purification method of the present invention, include iron-bearing titania and various minerals such as mica, ilmenite, or tourmaline, which are generally also iron-containing.

Thus, the clay, which selectively associates with the modified resin of the present invention, is separately recoverable from metals, metal oxides, and coal. In the purification of clay, it is often advantageous to employ, in conjunction with the modified resin of the present invention as a depressant, an anionic collector such as oleic acid, a flocculant such as polyacrylamide, a clay dispersant such as a fatty acid or a rosin acid, and/or oils to control frothing.

Other representative froth flotation processes of the present invention involve the beneficiation of coal, phosphate or potash, as well as other value metals and minerals discussed above, in which the removal of siliceous gangue materials such as sand and/or clay and other impurities is an important factor in achieving favorable process economics. Potassium ores and other ores, for example, generally comprise a mixture of minerals in addition to sylvite (KCl), which is desirably recovered in the froth concentrate. These include halite (NaCl), clay, and carbonate minerals which are non-soluble in water, such as aluminum silicates, calcite, dolomite, and anhydrite. Other ore impurities include iron oxides, titanium oxides, iron-bearing titania, mica, ilmenite, tourmaline, aluminum silicates, calcite, dolomite, anhydrite, ferromagnesian, feldspar, and debris or various other solid impurities such as igneous rock and soil. In the case of coal beneficiation, non-combustible solid materials such as calcium magnesium carbonate are considered impurities.

One approach, particularly in the refining of clay-containing ores, involves the further modification of the base resin with an anionic functional group, as described in greater detail below.

The modified resin of the present invention is also advantageously employed in the separation of bitumen from sand and/or clay that are co-extracted from natural oil sand deposits. Bitumen/sand mixtures that are removed from oil or tar sands within several hundred feet of the earth's surface are generally first mixed with warm or hot water to create an aqueous slurry of the oil sand, having a reduced viscosity that facilitates its transport (e.g., by pipeline) to processing facilities. Steam and/or caustic solution may also be injected to condition the slurry for froth flotation, as well as any number of other purification steps, described below. Aeration of the bitumen-containing slurry, comprising sand or clay, results in the selective flotation of the bitumen, which allows for its recovery as a purified product. This aeration may be effected by merely agitating the slurry to release air bubbles and/or introducing a source of air into the bottom of the separation cell. The optimal amount of air needed to float the desired bitumen, without entraining excessive solid contaminants, is readily determined by one of ordinary skill in the art.

Thus, the use of the modified resin depressant of the present invention advantageously promotes the retention of the sand and/or clay impurities in an aqueous fraction, which is removed from the bottom section of the froth flotation vessel. This bottoms fraction is enriched (i.e., has a higher concentration of) the sand and/or clay impurities, relative to the initial bitumen slurry. The overall purification of bitumen may rely on two or more stages of flotation separation. For example, the middle section of a primary flotation separation vessel may contain a significant amount of bitumen that can ultimately be recovered in a secondary flotation of this "middlings" fraction.

The modified resin may also benefit the froth flotation of value materials described herein to remove metallic contaminants and heavy metals in particular, including mercury, cadmium, lead, and arsenic as well as compounds containing these heavy metals. The treatment of an ore slurry with the modified resin may alternatively be accompanied by, rather than froth flotation, any of the types of separations discussed below (e.g., filtration, cyclone separation, flotation without the use of rising air bubbles, etc.), as well as dissolved air flotation, as discussed below with respect to the removal of mercury from synthetic gypsum. In the case of heavy metal contaminant removal, the purification of coal represents a specific application of increasing environmental significance. Coal typically contains, for example, on the order of 0.03-0.3 parts per million (ppm) of total mercury by weight, on a volatile free basis (or non-volatile basis, as described herein). Ever-tightening regulatory standards for airborne mercury emissions have led to requirements for highly effective mercury abatement systems (e.g., activated carbon sorbent materials) on flue gas emissions from coal-fired power plants. The burden on such systems may therefore be reduced through the beneficiation of coal ore that is employed in power generation, in order to reduce the content of total mercury present therein. Currently, about 100 million tons of coal ore are processed using conventional froth flotation.

Mercury may also accumulate in systems designed for reducing sulfur emissions (primarily $SO_2$) from coal-fired power plants. Sulfur removal and recovery, for example, is often accomplished through flue gas desulfurization processes that involve scrubbing (or contacting) the effluent gases from coal combustion with an aqueous alkaline solution that readily dissolves, reacts with, and neutralizes sulfur oxide contaminants. Often, an economically attractive method of sulfur recovery involves the use of aqueous calcium hydroxide (or lime) as the scrubbing medium, which reacts with sulfur oxides to form calcium sulfate, also known as synthetic gypsum. The resulting slurry of precipitated synthetic gypsum may be filtered to reduce its moisture content and further processed in conventional gypsum operations such as in the production of gypsum wallboard.

The presence of mercury in coal can therefore ultimately lead to mercury contamination in synthetic gypsum produced via flue gas desulfurization. In particular, trace amounts of gaseous mercury in flue gas tend to collect in alkaline scrubbing solutions. Moreover, gaseous hydrogen chloride, also normally present in flue gas, converts elemental mercury to $HgCl_2$, which can adhere to the precipitated, solid synthetic gypsum particles.

Treatment of the synthetic gypsum slurry with a depressant comprising the modified resin of the present invention, combined with froth flotation or other separation methods as described herein, allows for a reduction in the level of mercury contamination. It is also possible to form a slurry of synthetic gypsum that has been dehydrated, for example using filtration as described above, and thereafter treat this slurry with the modified resin, in order to effectively reduce the quantity of mercury via froth flotation. Preferably, however, the inefficiencies associated with dehydration and subsequent rehydration are avoided by treating the slurry prior to filtration of the synthetic gypsum and subjecting this slurry to froth flotation. In any event, representative beneficiation methods of the present invention comprise treating a slurry of ore comprising coal or synthetic gypsum with a depressant comprising the modified amine-aldehyde resin of the present invention. In the case of synthetic gypsum, this material to be purified is preferably formed, as described above, during desulfurization of flue gas from a coal-burning power plant.

Treatment of a synthetic gypsum slurry may be combined with froth flotation either during or subsequent to the treatment. Beneficiation may alternatively involve any of the separation processes discussed herein (e.g., filtration, size or density classification, etc.). A particular separation process of interest in the removal of mercury from synthetic gypsum is known as dissolved air flotation (DAF), which may be facilitated using the modified resin. The use of DAF in the removal of algae and arsenic from water is described, for example, by Wert et al., Proceedings—Water Quality Technology Conference (2003), p. 902-918. Regardless of the nature of the separation, however, the recovery and/or purity of purified synthetic gypsum in a separation process for the removal of mercury may be enhanced using one or more chelating agents, as discussed below, in combination with the modified resin. Chelating agents particularly useful in the separation of mercury from synthetic gypsum will not only form a complex with mercury, but will also contain a functionality that improves the ability of the complexed species to selectively report to a desired stream, such as a froth concentrate (e.g., in a froth flotation where the purified synthetic gypsum product is selectively depressed). Such functionalities include those common in conventional collectors, which aid in flotation, or those which aid in solvation or solubilization of the complexed mercury.

In a representative beneficiation process using froth flotation, treatment of the coal or synthetic gypsum feed slurry with the modified resin may occur before or during the froth flotation. As a result of froth flotation, purified coal or purified synthetic gypsum may be selectively recovered in either the froth concentrate or selectively depressed into the bottoms or tailings stream, depending on the particular operating conditions employed. Likewise, mercury and mercury-containing compounds may be selectively floated or selectively depressed. Froth flotation parameters that determine which components are depressed or floated in a particular separation are well known to those having skill in the art. Normally, in the froth flotation of synthetic gypsum, purified synthetic gypsum is selectively depressed while the relatively smaller amounts of mercury and other contaminants are selected floated. Conversely, the froth flotation of coal is normally performed such that the purified coal is selectively recovered in the froth concentrate while mercury and other impurities are selectively recovered in the bottoms or tailings stream.

In any event, whether mercury contaminants are selectively floated or depressed, their separation from the value mineral may be enhanced through the use of one or more conventional chelating agents in conjunction with the modified resin. A chelating agent may be added to the ore slurry together with the modified resin, or alternatively before or after the modified resin is added. Suitable chelating agents have the capacity to effectively bind or form a metal-ligand complex with mercury. Chelating agents may additionally improve coal beneficiation by removing iron contaminants and iron sulfide (pyrite) in particular. The reduction of both the iron and sulfur content of the purified coal improves both its fuel value (through the reduction of non-combustibles) as well as its acid gas emission characteristics (through the reduction of sulfur).

Chelating agents include, for example, multi-functional carboxylates such as hydroxyethylenediaminetriacetic acid (HEDTA), diethylenetriaminepentaacetic acid (DTPA), ethylenediaminetetraacetic acid (EDTA), diethyltriaminepentaacetic (DTPA), and nitrilotriacetic acid (NTA), which are typically used in their corresponding acetate salt forms (e.g., their sodium salt forms, such as pentasodium DTPA or trisodium NTA). These chelating agents include, for example, those in the Dissolvine® family of products (Akzo-Nobel Functional Chemicals bv, Netherlands), such as Dissolvine® H-40, Dissolvine® D-40, Dissolvine® D-40-L, and Dissolvine® A-150-S. Salts of oxalic acid (oxalate salts) may also be employed alone or in combination with these chelating agents. Amino acids are also useful as agents having a carboxylic acid group which can chelate with iron and other metal contaminants. When used in conjunction with the modified resin, the amine group of an amino acid can covalently react into the modified resin backbone, thereby providing the modified resin with a desired chelation functionality. Suitable amino acids include arginine, cysteine, serine, alanine, etc. Likewise, agents such as caprolactam and other cyclic amides can be hydrolyzed to form species having both amino and carboxylic acid functional groups which can similarly add chelation functionality to the modified resin.

Other classes of chelating agents include resins having sulfur atom-bearing functional groups, such as thiosemicarbazide and its derivatives. Thiosemicarbazide may be incorporated into resins such as styrene-divinylbenzene copolymers or ion exchange resins such as the weakly acidic Amberlite IRC-50® (Rohm and Haas Company, Philadelphia, Pa. USA). In the latter case, the resulting polymer contains a multidentate chelate ring containing O, N, and S donor sites. A representative thiosemicarbazide derivative functional group is diacetyl-bis(N-methylthiosemicarbazone).

Other sulfur-containing additives may likewise improve the efficiency (e.g., product purity and/or recovery) of froth flotation in the removal of mercury from coal or synthetic gypsum, and may therefore be employed in combination with the modified resin and optionally further in combination with one or more of the above-described chelating agents. Species having one or more mercapto functional groups, as well as one or more acid functional groups, are effective in this application and these include, for example, 2,3 dimercaptopropanesulfonate sodium (DMPS) and 2,3 meso dimercaptosuccinic acid (DMSA). Other sulfur-containing species such as alpha-lipoic acid, cysteine, and glutathione may also be employed for the formation of mercury complexes, resulting in improved sequestration of mercury in the froth flotation bottoms. Thioacid homologues of the carboxylic acid chelating agents discussed above, as well as their corresponding thioester derivatives, are also suitable for this purpose. Iodine-containing derivatives of any of the chelating agents discussed above may also be effective in the formation of stable complexes with mercury and other metal impurities. The effectiveness associated with any given amount of any of the above chelating agents, sulfur-containing compounds, or other additives for any particular application can be readily ascertained by those having skill in the art, in view of the present disclosure. In the case of a given sulfur containing compound, its effectiveness will depend not only on its affinity for mercury contaminants in coal or synthetic gypsum, but also on the ease of its separation, both in its complexed and un-complexed state, from the purified product.

Other additives which may be used in combination with the modified resin, to potentially improve its performance in coal ore beneficiation by froth flotation, include known reagents, collectors, frothers, promoters, and other agents used in this service, as described, for example, by Laskowski, COAL FLOTATION AND FINE COAL UTILIZATION, Elsevier (2001).

As a result of beneficiation, the final amount of total mercury present in the ore (e.g., comprising coal or synthetic gypsum) is less than the initial amount (i.e., the initial amount of total mercury is reduced), on a volatile free weight basis. In representative embodiments, the final amount of total mercury is less than about 10 parts per billion (ppb), less than about 5 ppb, or even less than 1 ppb. The final amount of total mercury may range, for example, from about 1 to about 100 ppb, from about 1 to about 10 ppb, or from about 5 to about 50 ppb. Any conventional method (e.g., inductively coupled plasma (ICP) or atomic absorption spectrometry (AAS) analysis) may be used in the determination of the total mercury amount, which refers to the amount of mercury present both in elemental form and in the form of mercury-containing compounds.

In the case of coal ore used in power plants, the removal of other impurities, in addition to heavy metals, can significantly improve the fuel value and/or the resulting combustion emissions of the purified coal recovered via froth flotation or other separation processes discussed herein. The reduction of nitrogen- and sulfur-containing compounds, for example, is important in many cases for compliance with nitrogen oxide and sulfur oxide emission tolerances designed to reduce the prevalence of these acid rain precursors in the environment. Froth flotation of an impure coal ore is conventionally employed for upgrading coal-fired power plant feedstocks in this manner. The removal of unwanted contaminants with froth flotation may be facilitated by treating an aqueous slurry of the impure coal ore with a modified resin of the present invention, either before or during the froth flotation. Conventional froth flotation in coal ore beneficiation is generally described, for example, at http://www.cq-inc.com/Coal Primer.pdf. Purified coal recovered in the froth concentrate may have a reduced amount, relative to the impure coal, of an impurity such as nitrogen, sulfur, silicon, ash, or pyrite. The reduction in these impurities is determined on a volatile free basis, as described herein (e.g., on a volatile free weight basis).

The amount of nitrogen impurity refers to the total amount of nitrogen present in nitrogen-containing compounds in a coal sample, expressed in terms of a weight fraction (or weight-%, weight-ppm, etc.) of the element relative to the total volatile free sample weight. Other conventional measures and analyses may also be used to compare the relative amounts of nitrogen in the impure and purified coal samples, such as measurements of the total organic nitrogen, total basic nitrogen, etc. Sulfur and silicon impurities refer to the total amounts of sulfur and silicon present either in elemental form or in compounds containing these elements, also generally expressed as a weight fraction on a volatile free weight basis. Silicon generally represents a significant portion of the non-combustible ash component of coal. As such, beneficiation for the reduction in the amount of measured ash may similarly be facilitated according to methods described herein. Pyrite (or iron sulfide) is also normally measured on a volatile free weight basis, for comparison of the amount of this impurity in the purified coal relative to that in the impure coal ore. A reduction in pyrite content of coal reduces the amount of sulfur impurity and also improves the fuel value (e.g., measured in BTU/lb).

Other benefits associated with the use of the modified resin in the froth flotation of coal may therefore include an increased BTU value per unit weight, or alternatively (or in combination) a reduced amount of moisture. In any event, the reduced amount(s) of one or more (e.g., two or more, or all) of the impurities described above, in the purified coal recovered in the beneficiation, using froth flotation, of impure coal ore, is/are preferably less than the corresponding reference amount(s) in a purified reference coal recovered in the same froth flotation operation, but without using the modified resin. Preferred moisture levels of coal that is purified according to any of the methods described herein are less than bout 12% by weight, in the range from about 5% to about 12% by weight, and in the range from about 5% to about 10% by weight. Preferred fuel values are greater than about 12,000 BTU/lb, and in the range from about 12,000 to about 13,000 BTU/lb.

Generally, in any froth flotation process according to the present invention, at least 70% of the value material (e.g., kaolin clay, phosphate, or bitumen) is recovered from the raw material (e.g., the clay-containing ore), with a purity of at least 85% by weight. Also, conventional known collectors may be used in conjunction with modified resins of the present invention, when used as depressants. These collectors include, for example, fatty acids (e.g., oleic acid, sodium oleate, hydrocarbon oils), amines (e.g., dodecylamine, octadecylamine, $\alpha$-aminoarylphosphonic acid, and sodium sarcosinate), and xanthanate. Likewise, conventional depressants known in the art for a given separation can also be combined with the modified resin depressants. For example, in the case of phosphate ore froth flotation, conventional depressants include guar gum and other hydrocolloidal polysaccharides, sodium hexametaphosphate, etc. Conventional frothing agents that aid collection, (e.g., methylisobutylcarbinol, pine oil, and polypropylene oxides) may also be used, in accordance with normal flotation practice, in conjunction with the modified resin depressants of the present invention.

In froth flotation separations, the pH of the slurry to which the modified resins of the present invention, when used as depressants, are added will vary according to the particular material to be processed, as is appreciated by those skilled in the art. Commonly, the pH values range from neutral (pH 7) to strongly alkaline (e.g., pH 12). It is recognized that in some flotation systems, for example in copper sulfide flotations, high pH values (e.g., from about 8 to about 12.5) give best results.

Typically in froth flotation for the beneficiation of solid materials such as mineral or metal ores, the raw materials are usually first ground to the "liberation mesh" size where most of the value material-containing particles are either separate mineral or metal particles or salt crystals, and the gangue (e.g., clay and/or sand) is mixed between these particles. The solid material may be ground to produce, for example, one-eighth inch average diameter particles prior to incorporation of the material into a brine solution to yield an aqueous slurry. After crushing and slurrying the material, the slurry may be agitated or stirred in a "scrubbing" process that breaks down clay or ash into very fine particles that remain in the brine as a muddy suspension. Some of this clay or ash may be washed off the ore particles, into a clay-containing aqueous suspension or brine, prior to froth flotation. Also, as is known in the art, any conventional size classification operations, some of which are discussed in greater detail below, may be employed to further reduce/classify raw material particle size, remove clay- or ash-containing brine, and/or recover smaller solid particles from the muddy brine, prior to froth flotation. Such size classification operations include further crushing/screening, cycloning, and/or hydro separation, any of which may be performed with or without the use of a modified resin.

Ore beneficiation according to the present invention comprises treating an aqueous slurry of the ore with a depressant comprising a modified resin, as described herein. The treatment of the ore slurry with the depressant typically involves combining the depressant and slurry (e.g., by adding the depressant to the slurry), normally in a manner such that the depressant is readily dispersed throughout. The treatment may occur before or during froth flotation, or before or during any of the other separation processes described herein (e.g., filtration, cyclone separation, dissolved air flotation, etc.). In the case of treatment before froth flotation, the treatment may also comprise conditioning the ore in the presence of the depressant, prior to froth flotation. Conditioning may be beneficial in allowing the depressant and ore slurry to thoroughly mix for a given time period, typically from about 30 seconds to about 10 minutes, prior to subjecting the mixture to aeration or froth flotation. During the conditioning time, the depressant can become associated, for example, with unwanted gangue material, thereby improving the performance of the subsequent froth flotation. Conditioning of a depressant/slurry mixture in the absence of aeration or froth flotation can occur in a separate conditioning vessel such as a mixer or mechanical flotation cell, pipe, barrel, etc. prior to transfer of the mixture to a froth flotation cell. Alternatively, conditioning can occur in the same vessel used for froth flotation. The same or different conditions in terms of temperature, pH, agitation, etc., may be used for conditioning and froth flotation. Typical conditions that may be employed in a conditioning step include a temperature from about 1° C. to about 95° C. and a pH of at least about 2.0, and often a pH from about 3.0 to about 7.0. Also, the same agents, as conventionally used and/or discussed herein, may be incorporated into the ore slurry in a conditioning step, in addition to the depressant. Such agents include collectors, activators, frothing agents, pH modifiers, etc.

In froth flotation, the slurry, typically having a solids content from about 5% to about 50% by weight, is transferred to one or more froth flotation cells. Air is forced through the bottoms of these cells and a relatively hydrophobic fraction of the material, having a selective affinity for the rising bubbles, floats to the surface (i.e., the froth), where it is skimmed off and recovered in the froth concentrate. A bottoms product that is hydrophilic relative to the froth concentrate may also be recovered. The process may be accompanied by agitation. Commercially salable products can be prepared from the separate fractions recovered in this manner, often after further conventional steps, including further separation (e.g., by centrifuge), drying (e.g., in a gas fired kiln), size classification (e.g., screening), and refining (e.g., crystallization), are employed.

The froth flotation of the present invention may, though not always, involve flotation in "rougher cells" followed by one or more "cleanings" of the rougher concentrate. Two or more flotation steps may also be employed to first recover a bulk value material comprising more than one component, followed by a selective flotation to separate these components. Modified resins of the present invention, when used as depressants, can be used to advantage in any of these steps to improve the selective recovery of desired materials via froth flotation. When multiple stages of froth flotation are used, the modified resins may be added using a single addition prior to multiple flotations or they may be added separately at each flotation stage.

Other Separations

Because of their affinity for solid contaminants in liquid suspensions, the modified resins of the present invention are applicable in a wide variety of separations, and especially those involving the removal of siliceous contaminants such as sand, clay, and/or ash from aqueous liquid suspensions or slurries of these contaminants. Such aqueous suspensions or slurries may therefore be treated with modified resins of the present invention, allowing for the effective separation of at least a portion of the contaminants, in a contaminant-rich fraction, from a purified liquid. A "contaminant-rich" fraction refers to a part of the liquid suspension or slurry that is enriched in solid contaminants (i.e., contains a higher percentage of solid contaminants than originally present in the liquid suspension or slurry). Conversely, the purified liquid has a lower percentage of solid contaminants than originally present in the liquid suspension or slurry.

The separation processes described herein are applicable to "suspensions" as well as to "slurries" of solid particles. These terms are sometimes defined equivalently and sometimes are distinguished based on the need for the input of at least some agitation or energy to maintain homogeneity in the case of a "slurry." Because the methods of the present invention, described herein, are applicable broadly to the separation of solid particles from aqueous media, the term "suspension" is interchangeable with "slurry" (and vice versa) in the present specification and appended claims.

The treatment step may involve adding a sufficient amount of the modified resin to electronically interact with and either coagulate or flocculate the solid contaminants into larger agglomerates. The necessary amount can be readily determined depending on a number of variables (e.g., the type and concentration of contaminant), as is readily appreciated by those having skill in the art. In other embodiments, the treatment may involve contacting the liquid suspension continuously with a fixed bed of the modified resin, in solid form.

During or after the treatment of a liquid suspension with the modified resin, the coagulated or flocculated solid contaminant (which may now be, for example, in the form of larger, agglomerated particles or flocs) is removed. Removal may be effected by flotation (with or without the use of rising air bubbles as described previously with respect to froth flotation) or sedimentation. The optimal approach for removal will depend on the relative density of the flocs and other factors. Increasing the quantity of modified resin that is used to treat the suspension can in some cases increase the tendency of the flocs to float rather than settle. Filtration or straining may also be an effective means of removing the agglomerated flocs of solid particulates, regardless of whether they reside predominantly in a surface layer or in a sediment.

Examples of liquid suspensions that may be purified according to the present invention include oil and gas well drilling fluids, which accumulate solid particles of rock (or drill cuttings) in the normal course of their use. These drilling fluids (often referred to as "drilling muds") are important in the drilling process for several reasons, including transporting these drill cuttings from the drilling area to the surface, where their removal allows the drilling mud to be recirculated. The addition of modified resins of the present invention to oil well drilling fluids, and especially water-based (i.e., aqueous) drilling fluids, effectively coagulates or flocculates solid particle contaminants into larger clumps (or flocs), thereby facilitating their separation by settling or flotation. The modified resins of the present invention may be used in conjunction with known flocculants for this application such as polyacrylamides or hydrocolloidal polysaccharides. Generally, in the case of suspensions of water-based oil or gas well drilling fluids, the separation of the solid contaminants is sufficient to provide a purified drilling fluid for reuse in drilling operations.

Other aqueous suspensions of practical interest include the clay-containing aqueous suspensions or brines, which accompany ore refinement processes, including those described above. The production of purified phosphate from mined calcium phosphate rock, for example, generally relies on multiple separations of solid particulates from aqueous media, whereby such separations can be improved using the modified resin of the present invention. In the overall process, calcium phosphate is mined from deposits at an average depth of about 25 feet below ground level. The phosphate rock is initially recovered in a matrix containing sand and clay impurities. The matrix is first mixed with water to form a slurry, which, typically after mechanical agitation, is screened to retain phosphate pebbles and to allow fine clay particles to pass through as a clay slurry effluent with large amounts of water.

These clay-containing effluents generally have high flow rates and typically carry less than 10% solids by weight and more often contain only from about 1% to about 5% solids by weight. The dewatering (e.g., by settling or filtration) of this waste clay, which allows for recycle of the water, poses a significant challenge for reclamation. The time required to dewater the clay, however, can be decreased through treatment of the clay slurry effluent, obtained in the production of phosphate, with the modified resin of the present invention. Reduction in the clay settling time allows for efficient re-use of the purified water, obtained from clay dewatering, in the phosphate production operation. In one embodiment of the purification method, wherein the liquid suspension is a clay-containing effluent slurry from a phosphate production facility, the purified liquid contains less than about 1% solids by weight after a settling or dewatering time of less than about 1 month.

In addition to the phosphate pebbles that are retained by screening and the clay slurry effluent described above, a mixture of sand and finer particles of phosphate is also obtained in the initial processing of the mined phosphate matrix. The sand and phosphate in this stream are separated by froth flotation which, as described earlier, can be improved using the modified resin of the present invention as a depressant for the sand.

In the area of slurry dewatering, another specific application of the modified resin is in the filtration of coal from water-containing slurries. The dewatering of coal is important commercially, since the BTU value per unit weight and hence the quality of the coal decreases with increasing water content. In one embodiment of the invention, therefore, the modified resin is used to treat an aqueous coal-containing suspension or slurry prior to dewatering the coal by filtration.

As used herein, "beneficiation" broadly refers to any process for purifying and/or upgrading a value material as described herein. In the case of coal ore purification, a number of beneficiation operations are conventionally used in an effort to improve the quality of coal that is burned, for example, in electricity-generating power plants. As discussed previously, for example, such quality improvement processes address environmental concerns that have resulted in lower tolerances for metallic contaminants such as mercury and arsenic, as well as nitrogen- and sulfur-containing compounds that lead to acid rain. Froth flotation, as discussed previously, affords one method for the purification of a coal ore via treatment of an aqueous slurry of the ore with the modified resin of the present invention. Treatment can alternatively occur prior to or during conventional coal size or density classification operations to facilitate the reduction in the amount(s) of one or more of the mercury, nitrogen, sulfur, silicon, ash, and pyrite impurities in the purified coal, wherein these impurities are measured on a volatile free weight basis and as described previously. The modified amine-aldehyde resin can also be used in conjunction with size or density classification operations to reduce moisture and/or increase the fuel value of the purified coal (e.g., measured in BTU/lb). Preferably, the reduction of the amount(s) of one or more (e.g., two or more, or all) of the impurities described above, in the purified coal recovered in the size or density classification operation is/are preferably less than the corresponding reference amount(s) in a purified reference coal recovered in the same size or density classification operation, but without using the modified amine-aldehyde resin.

In general, the reduction of one of the impurities noted above in the purified coal, results in a corresponding reduction in the amount of one or more other undesired impurities. For example, a reduction in pyrite generally leads to a reduction in mercury and other inorganic materials such as silicon-containing ash. In one embodiment, the use of one or more size or density classification operations in conjunction with the modified amine-aldehyde resin results in a reduction in amounts of all the impurities noted above.

Suitable conventional size or density classification operations include cyclone separation, heavy medium (or heavy media or dense medium) separation, filtration, and screening, any of which may be used in combination (e.g., serially or in parallel) with each other or with froth flotation. Generally, these operations precede froth flotation to provide, in combination with froth flotation, an upgraded or purified coal meeting the various specifications (e.g., nitrogen and sulfur levels) required for combustion in electricity-generating power plants. For example, water-only or clarifying cyclone operations process a feed stream of a raw coal ore slurry, which is fed tangentially under pressure into a cyclone. Centrifugal force moves heavier material to the cyclone wall, where it is subsequently typically transported to the underflow at the apex (or spigot). Lighter coal particles that are disposed toward the center of the cyclone are removed via a pipe (or vortex finder) to the overflow. The targeted density at which light and heavy particles are separated may be adjusted by varying pressure, vortex finder length, and/or apex diameter. Such water-only or clarifying cyclones typically treat material in the 0.5-1 mm size range and may involve two ore more stages of separation to improve separation efficiency.

Heavy medium separation uses a dense liquid medium (e.g., magnetite at a specified magnetite/water ratio) to float particles (e.g., coal) having a density below that of the medium and depress particles (e.g., sand or rock) having a density above that of the medium. Heavy medium separation may be employed in a simple deep or shallow "bath" configuration or may be included as part of a cyclone separation operation to enhance the gravitational separation forces with centrifugal forces. Often, one or more stages of a clarifying cyclone separation operation are followed by one or more stages of heavy medium cyclone separation and one ore more screening steps to yield an appropriately sized and purified (e.g., a pre-conditioned or pre-treated) coal feedstock for subsequent froth flotation.

Another significant application of the modified resin of the present invention is in the area of sewage treatment, accompanied by various processes that are undertaken to remove contaminants from industrial and municipal waste water. Such processes thereby purify sewage to provide both purified water that is suitable for disposal into the environment (e.g., rivers, streams, and oceans) as well as a sludge. Sewage refers to any type of water-containing wastes which are normally collected in sewer systems and conveyed to treatment facilities. Sewage therefore includes municipal wastes from toilets (sometimes referred to as "foul waste") and basins, baths, showers, and kitchens (sometimes referred to as "sullage water"). Sewage also includes industrial and commercial waste water, (sometimes referred to as "trade waste"), as well as stormwater runoff from hard-standing areas such as roofs and streets.

Conventional processes for purifying sewage often involve preliminary, primary, and secondary steps. Preliminary steps often include the filtration or screening of large solids such as wood, paper, rags, etc., as well as coarse sand and grit, which would normally damage pumps. Subsequent primary steps are then employed to separate most of the remaining solids by settling in large tanks, where a solids-rich sludge is recovered from the bottom of these tanks and processed further. A purified water is also recovered and normally subjected to secondary steps involving biological processes.

Thus, in one embodiment of the present invention, the purification of sewage water by settling or sedimentation may comprise treating the sewage water, before or during the settling or sedimentation operation, with the modified resin of the present invention. This treatment may be used to improve settling operation (either batch or continuous), for example, by decreasing the residence time required to effect a given separation (e.g., based on the purity of the purified water and/or the percent recovery of solids in the sludge). Otherwise, the improvement may be manifested in the generation of a higher purity of the purified water and/or a higher recovery of solids in the sludge, for a given settling time.

After treatment of sewage with the modified resin of the present invention and removing a purified water stream by sedimentation, it is also possible for the modified resin to be subsequently used for, or introduced into, secondary steps as described above to further purify the water. These secondary operations normally rely on the action of naturally occurring microorganisms to break down organic material. In particular, aerobic biological processes substantially degrade the biological content of the purified water recovered from primary steps. The microorganisms (e.g., bacteria and protozoa) consume biodegradable soluble organic contaminants (e.g., sugars, fats, and other organic molecules) and bind much of the less soluble fractions into flocs, thereby further facilitating the removal of organic material.

Secondary processes rely on "feeding" the aerobic microorganisms oxygen and other nutrients which allow them to survive and consume organic contaminants. Advantageously, the modified resin of the present invention, which contains nitrogen, can serve as a "food" source for microorganisms involved such secondary processing steps, as well as potentially an additional flocculant for organic materials. In one embodiment of the invention, therefore, the sewage purification method further comprises, after removing purified water (in the primary treatment step) by sedimentation, further processing the purified water in the presence of microorganisms and the modified resin, and optionally with an additional amount of modified resin, to reduce the biochemical oxygen demand (BOD) of the purified water. As is understood in the art, the BOD is an important measure of water quality and represents the oxygen needed, in mg/l (or ppm by weight) by microorganisms to oxidize organic impurities over 5 days. The BOD of the purified water after treatment with microorganisms and the modified resin, is generally less than 10 ppm, typically less than 5 ppm, and often less than 1 ppm.

The modified resin of the present invention may also be applied to the purification of pulp and paper mill effluents.

These aqueous waste streams normally contain solid contaminants in the form of cellulosic materials (e.g., waste paper; bark or other wood elements, such as wood flakes, wood strands, wood fibers, or wood particles; or plant fibers such as wheat straw fibers, rice fibers, switchgrass fibers, soybean stalk fibers, bagasse fibers, or cornstalk fibers; and mixtures of these contaminants). In accordance with the method of the present invention, the effluent stream comprising a cellulosic solid contaminant is treated with the modified resin of the present invention, such that purified water may be removed via sedimentation, flotation, or filtration.

In the separation of bitumen from sand and/or clay impurities as described previously, various separation steps may be employed either before or after froth flotation of the bitumen-containing slurry. These steps can include screening, filtration, and sedimentation, any of which may benefit from treatment of the oil sand slurry with the modified resin of the present invention, followed by removal of a portion of the sand and/or clay contaminants in a contaminant-rich fraction (e.g., a bottoms fraction) or by removal of a purified bitumen fraction. As described above with respect to phosphate ore processing water effluents, which generally contain solid clay particles, the treating step can comprise flocculating these contaminants to facilitate their removal (e.g., by filtration). Waste water effluents from bitumen processing facilities will likewise contain sand and/or clay impurities and therefore benefit from treatment with the modified resin of the present invention to dewater them and/or remove at least a portion of these solid impurities in a contaminant-rich faction. A particular process stream of interest that is generated during bitumen extraction is known as the "mature fine tails," which is an aqueous suspension of fine solid particulates that can benefit from dewatering. Generally, in the case of sand and/or clay containing suspensions from a bitumen production facility, separation of the solid contaminants is sufficient to allow the recovery or removal of a purified liquid or water stream that can be recycled to the bitumen process.

The treatment of various intermediate streams and effluents in bitumen production processes with the modified resin of the present invention is not limited only to those process streams that are at least partly subjected to froth flotation. As is readily appreciated by those of skill in the art, other techniques (e.g., centrifugation via the "Syncrude Process") for bitumen purification will generate aqueous intermediate and byproduct streams from which solid contaminant removal is desirable.

The modified resins of the present invention can be employed in the removal of suspended solid particulates, such as sand and clay, in the purification of water, and particularly for the purpose of rendering it potable. Moreover, modified resins of the present invention have the additional ability to complex metallic cations (e.g., lead and mercury cations) allowing these unwanted contaminants to be removed in conjunction with solid particulates. Therefore, modified resins of the present invention can be used to effectively treat impure water having both solid particulate contaminants as well as metallic cation contaminants. Without being bound by theory, it is believed that electronegative moieties, such as the carbonyl oxygen atom on the urea-formaldehyde resin polymer backbone, complex with undesired cations to facilitate their removal. Generally, this complexation occurs at a pH of the water that is greater than about 5 and typically in the range from about 7 to about 9.

Another possible mechanism for the removal of metallic cations is based on their association with negatively charged solid particulates. Flocculation and removal of these particulates will therefore also cause, at least to some extent, the removal of metallic cations. Regardless of the mechanism, in one embodiment, the treatment and removal of both of these contaminants can be carried out according to the present invention to yield potable water.

The removal of metallic cations may represent the predominant or even the sole means of water purification that is effected by the modified resin, for example when the water to be purified contains little or no solid particulates. Solid forms of the modified resin may be used to remove cations in a continuous process whereby the impure water containing metallic cations is continuously passed through a fixed bed of the resin. Alternatively, soluble forms of the modified resin, generally having a lower molecular weight, may be added to the impure water in order to treat it. The complexed cations in this case can be removed, for example, by ultrafiltration through a porous membrane (e.g., polysulfone) having a molecular weight cutoff that is less than the molecular weight of the modified resin. The water purification methods described herein may also be used in conjunction with known methods including reverse osmosis, UV irradiation, etc.

To increase the effectiveness of the modified resins in complexing with metallic cations, it may be desirable to further modify the base resin as described above with one or more anionic functional groups. Such modifications are known in the art and can involve the reaction of the base resin or modified resin to incorporate the desired functional group (e.g., by sulfonation with sodium metabisulfite). Alternatively, the further modification is achieved during preparation of the base resin (e.g., during condensation) by incorporating an anionic co-monomer, such as sodium acrylate, either into the base resin or into the coupling agent. For example, as described above, organopolysiloxane derivatives used as coupling agents may be prepared by incorporating further organic resin functionalities, such as acrylate, into the coupling agent. Representative additional functionalities with which the base resin or modified resin, including a urea-formaldehyde resin, may be modified include the anionic functional groups bisulfite, acrylate, acetate, carbonate, azide, amide, etc. Procedures for modifying the base resin with additional functionalities are known to those having skill in the art. The incorporation of anionic functional groups into the base resin may also be employed in separations involving the purification of slurries containing solid clay particles (e.g., by froth flotation, flocculation, etc.), including those described above, such as in the purification of kaolin clay ore. Without being bound by theory, sulfonation of the base resin or the incorporation of other anionic functional groups can also increase hydrogen bonding between the base resin and the surrounding aqueous phase to inhibit condensation of the base resin or otherwise improve its stability.

As described above, therefore, the present invention, in one embodiment, is a method for purifying water containing a metallic cation by treating the water with a modified resin as described herein and which may be further modified with an anionic group. Removal of at least a portion of the metallic cations may be effected by retaining them on a fixed bed of the modified resin or otherwise by filtering them out. In the latter case, removal by filtration such as membrane filtration is made possible by the association of the metallic cations either directly with the modified resin or indirectly with the modified resin via solid particulates, for which the modified resin has affinity. In the case of indirect association, as described earlier, flocculation of the solid particulates will also necessarily agglomerate at least a portion of the metallic cations, which may therefore be removed by flotation or sedimentation of these particulates.

The modified resin of the present invention is therefore advantageously used to treat water for the removal of metallic cations such as arsenic, lead, cadmium, copper, and mercury that are known to pose health risks when ingested. These cations thus include $As^{+5}$, $Pb^{+2}$, $Cd^{+2}$, $Cu^{+2}$, $Hg^{+2}$, $Zn^{+2}$, $Fe^{+2}$, and mixtures thereof. Generally, a degree of removal is effected such that the purified water is essentially free of one or more of the above metallic cations. By "essentially free" is meant that the concentration(s) of one or more metallic cation(s) of interest is/are reduced to concentration(s) at or below those considered safe (e.g., by a regulatory agency such as the U.S. Environmental Protection Agency). Therefore, in various representative embodiments, the purified water will contain at most about 10 ppb of $As^{+5}$, at most about 15 ppb of $Pb^{+2}$, at most about 5 ppb of $Cd^{+2}$, at most about 1.3 ppm of $Cu^{+2}$, and/or at most about 2 ppb of $Hg^{+2}$. That is, generally at least one, typically at least two, and often all, of the above-mentioned cations are at or below these threshold concentration levels in the purified water.

In any of the applications described herein, it is possible to stabilize the modified resin of the present invention by reaction with an alcohol (i.e., etherification). Without being bound by theory, it is believed that etherification of pendant alkylol functionalities can inhibit further condensation of the base resin (e.g., condensation of a urea-formaldehyde resin with itself). This can ultimately hinder or prevent the precipitation of the base resin during long term storage, such that, relative to their corresponding non-etherified resins, the etherified resins can have increased molecular weight without an accompanying loss in stability Etherification thus involves reacting the amine-aldehyde adducts or condensates, or even the modified resins, as described above, with an alcohol. In one embodiment, a urea-formaldehyde base resin is etherified with an alcohol having from 1 to 8 carbon atoms, prior its modification with a coupling agent. Representative alcohols for use in the etherification include methanol (e.g., to effect methylation), ethanol, n-propanol, isopropanol, n-butanol, and isobutanol. In exemplary preparations of etherified base resins, the amine-aldehyde adduct or condensate reaction product is heated to a temperature from about 70° C. to about 120° C. in the presence of an alcohol until the etherification is complete. An acid such as sulfuric acid, phosphoric acid, formic acid, acetic acid, nitric acid, alum, iron chloride, and other acids may be added before or during the reaction with alcohol. Often, sulfuric acid or phosphoric acid is employed.

All references cited in this specification, including without limitation, all U.S., international, and foreign patents and patent applications, as well as all abstracts, papers (e.g., journal articles, periodicals, etc.), and Internet postings, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

Froth Flotation

EXAMPLE 1

Various urea-formaldehyde resins were prepared as low molecular weight condensate resins, initially under alkaline conditions to form methylolated urea adducts, and then under acidic conditions to form the condensate. The condensation reaction was stopped by raising the pH of the condensation reaction mixture. Other preparation conditions were as described above. These base resins are identified in Table 1 below with respect to their molecular weight (Mol. Wt.) in grams/mole and their approximate normalized weight percentages of free urea, cyclic urea species (cyclic urea), monomethylolated urea (Mono), and combined di-/tri-methylolated urea (Di/Tri). In each case, the base resins were in a solution having a resin solids content of 45-70%, a viscosity of 500 cps or less, and a free formaldehyde content of less than 5% by weight.

TABLE 1

Urea-Formaldehyde Base Resins

| ID | Mol. Wt.$^a$ | Free Urea | Cyclic Urea | Mono | Di/Tri |
|---|---|---|---|---|---|
| Resin A | 406 | 8 | 39 | 30 | 23 |
| Resin B* | 997 | 5 | 50 | 22 | 23 |
| Resin C and C'** | 500 | 6 | 46 | 25 | 23 |
| Resin D and D'*** | 131 | 43 | 21 | 30 | 6 |
| Resin E | 578 | 0 | 18 | 10 | 72 |
| Resin F | 1158 | 1 | 44 | 11 | 44 |
| Resin G | 619 | 0 | 26 | 3 | 71 |

*Resin B is a very stable urea-formaldehyde resin, having a high cyclic urea content. This resin is described in U.S. Pat. No. 6,114,491.
**Resin C' was formed by adding, in addition to Silane #1 (described below), 2% by weight of diethylenetriamine and 2% by weight dicyandiamide to the mixture of urea and formaldehyde during resin preparation.
***Resin D' was formed by adding 0.75% by weight cyclic phosphate ester to the mixture of urea and formaldehyde during resin preparation. The resin was a low molecular weight formulation with a high content of free urea, essentially no free formaldehyde, and a high content of non-volatiles (about 70% solids).
$^a$Number average molecular weight determined using gel permeation chromatography (GPC) with appropriately sized PLgel ™ columns (Polymer Laboratories, Inc., Amherst, MA, USA), 0.5% glacial acetic acid/tetrahydrofuran mobile phase at 1500 psi, and polystyrene, phenol, and bisphenol-A calibration standards.

The urea-formaldehyde resin solutions described above were modified by silane coupling agents, in order to prepare resin depressants of the present invention. Silane coupling agents #1, #2, or #3, all substituted silanes as identified in Table 2 below, were used in these modified resin preparations.

TABLE 2

Silane Coupling Agents

| ID | Type | Source |
|---|---|---|
| Silane #1 | Ureidopropyltrimethoxysilane | Silane A1160† |
| Silane #2 | Oligomeric aminoalkylsilane | Silane A1106† |
| Silane #3 | Aminopropyltriethoxysilane | Silane A1100† |

†Available under the trade name Silquest (GE Silicones-OSi Specialties, Wilton, CT, USA)

EXAMPLE 2

The above urea-formaldehyde base resins described in Table 1 were modified by the silane coupling agents #1, #2, and #3, as described in Table 2, according to procedures described previously. Namely, the silane coupling agent was added to the base resin solution in an amount of about 0.1-2.5% based on the weight of the resin solution, after formation of a low molecular weight condensate and the subsequent addition of a base to increase the solution pH and halt the condensation reactions, as described above. The alkaline mixture of the base resin and silane coupling agent was then heated to a temperature of about 35-45° C. for about 0.5-4 hours, until a viscosity of about 350-450 cps was achieved.

EXAMPLE 3

Various urea-formaldehyde resin samples, representing both unmodified resins or resins modified with silane coupling agents as noted above, along with a control depressant, were tested for their selectivity in removing siliceous sand and clay impurities from potash ore by froth flotation, in a laboratory-scale beneficiation study. In each test, the amount of depressant employed per unit weight of ore to be beneficiated, the solids content of the ore slurry, the pH of the slurry, the volumetric air flow rate per unit volume of the slurry, the phosphate purity of the ore prior to beneficiation, and other conditions were representative of a commercial operation. In each test, the ore recovered by flotation was at least 90% by weight pure phosphate material. A commercially available guar gum was used as a depressant control sample.

In these experiments, the performance of each depressant was measured based on the quantity of potash that could be recovered (i.e., floated) at a specified purity. This quantity provided the measure of each depressant's selectively in binding to unwanted gangue materials. In other words, the higher the selectivity of a depressant, the greater the quantity of 90% pure phosphate that could be floated. The following data were obtained, as shown in Table 3 below.

TABLE 3

Performance of Depressants in Phosphate Recovery

| Depressant | Grams of >90% Potassium Floated |
| --- | --- |
| Control 1-Guar Gum | 212 |
| Resin A, Modified by Silane #1 | 230 |
| Resin A, Unmodified | 85 |
| Resin B, Modified by Silane #1 | 226 |
| Resin B, Unmodified | 97 |
| Resin C, Modified by Silane #1 | 172 |
| Resin C', Modified by Silane #1 | 158 |
| Resin D, Modified by Silane #1 | 82 (avg. of 2 tests) |
| Resin D', Unmodified | 100 |
| Resin E, Modified by Silane #1 | 215 |
| Resin E, Modified by Silane #2 | 232 (avg. of 2 tests) |
| Resin E, Modified by Silane #3 | 226 (avg. of 2 tests) |
| Resin F, Modified by Silane #1 | 229 |
| Resin F, Modified by Silane #2 | 231 |
| Resin F, Modified by Silane #3 | 225 |
| Resin G, Modified by Silane #1 | 223 |
| Resin G, Modified by Silane #2 | 228 |
| Resin G, Modified by Silane #3 | 224 |

Based on the above results, the use of a silane coupling agent to modify a urea-formaldehyde base resin, preferably via a covalent link, can dramatically improve the resin performance as a depressant in froth flotation. Also, the performance advantage associated with the use of a silane coupling agent becomes more evident as the molecular weight of the base resin is increased. Especially good performance is obtained for base resins having a molecular weight above about 300 grams/mole, before modification. This is illustrated in FIG. 1, showing the performance of silane coupling agent-modified resins compared to unmodified resins, for resins having a molecular weight from about 400 to about 1200 grams/mole. Moreover, the performance of urea-formaldehyde resins within this molecular weight range is not appreciably affected by the use of additional resin modifiers (e.g., diethylenetriamine, dicyandiamide, phosphate esters, etc.) of the base resin.

FIG. 1 also illustrates that silane coupling agent-modified resins having a molecular weight from about 400 to about 1200 grams/mole perform superior to their unmodified counterpart and generally perform superior to guar gum, which is known in the art to bind clay and talc, but is considerably more expensive. Furthermore, in contrast to guar gum, the depressants of the present invention showed substantially higher selectivity for the flotation of coarse phosphate particles. The comparatively greater amount of fines material in the purified phosphate that was floated in the test with guar gum would add significantly to the expense associated with downstream drying and screening operations to yield a salable product.

EXAMPLE 4

A sample of a modified resin depressant of the present invention was tested for its performance in a potash beneficiation plant using froth flotation, relative to guar gum, which is currently employed at the plant as a commercial depressant of gangue materials. The depressant of the present invention used for this test was Resin F, Modified by Silane #2, as described in Examples 1-3 above.

For the comparative tests, the amount of depressant employed per unit weight of ore to be beneficiated, the solids content of the ore slurry, the pH of the slurry, the volumetric air flow rate per unit volume of the slurry, the potassium mineral purity of the ore prior to beneficiation, and other conditions were representative of a commercial operation. The performance of each depressant was measured based on the quantity of phosphate that could be recovered (i.e., floated) at a specified purity. This quantity provided the measure of each depressant's selectively in binding to unwanted gangue materials. In other words, the higher the selectivity of a depressant, the greater the quantity of potash that could be floated at a specified purity.

Relative to guar gum, the depressant of the present invention provided an increase in the yield of purified potash of about 19%. Furthermore, the yield of coarse particles of the desired potash (potassium chloride) mineral was substantially higher using the urea-formaldehyde resin, modified with a silane coupling agent. For the reasons explained above, this improvement in the yield of coarse material reduces costs associated with drier energy requirements and other downstream operations, as well as the overall processing time needed for further refinement, prior to sale.

EXAMPLE 5

Additional urea-formaldehyde resins were prepared as condensate resins as described in Example 1, but with generally higher molecular weights. These base resins are identified in Table 4 below with respect to their formaldehyde : urea (F:U) molar ratio, molecular weight (Mol. Wt.) in grams/mole and their approximate normalized weight percentages of free urea, cyclic urea species (cyclic urea), mono-methylolated urea (Mono), and combined di-/tri-methylolated urea (Di/Tri).

TABLE 4

Urea-Formaldehyde Base Resins

| ID | F:U (molar) | Mol. Wt. | Free Urea | Cyclic Urea | Mono | Di/Tri |
|---|---|---|---|---|---|---|
| Resin H | 2.73 | 3916 | 1 | 39 | 8 | 52 |
| Resin I | 2.15 | 1941 | 1 | 47 | 14 | 38 |
| Resin J | 1.97 | 1078 | 4 | 39 | 22 | 35 |
| Resin K | 1.86 | 503 | 7 | 25 | 28 | 40 |
| Resin L | 1.87 | 334 | 7 | 26 | 30 | 37 |

EXAMPLE 6

The above urea-formaldehyde base resins described in Table 4 were modified by the substituted silane coupling agent #3 (aminopropyltriethoxysilane, Silane A1100, available under the trade name Silquest (GE Silicones-OSi Specialties, Wilton, Conn., USA)), as described above in Table 2. The modification of these base resins was performed according to procedures described above in Example 2.

EXAMPLE 7

The modified urea-formaldehyde resin samples prepared in Example 6 were tested for their performance in a potash beneficiation plant, in which siliceous sand and clay impurities were removed from potash ore by froth flotation. The ore recovered (i.e., floated), as at least 90% by weight pure phosphate material, was calculated for each of the depressants prepared in Example 6, at both 1 lb/ton and 2 lb/ton depressant/raw ore dosage levels. This recovery was expressed as the weight percent of the theoretical yield. In each test, the solids content of the ore slurry, the pH of the slurry, the volumetric air flow rate per unit volume of the slurry, the phosphate purity of the ore prior to beneficiation, and other conditions were representative of a commercial operation. The following data were obtained, as shown in Table 5 below.

TABLE 5

Performance of Depressants in Phosphate Recovery

| | Percent Recovery of >90% Pure Potassium | |
|---|---|---|
| Depressant | 1 lb/ton dosage | 2 lb/ton dosage |
| Resin H, Modified by Silane #3 | 30.60 | 33.56 |
| Resin I, Modified by Silane #3 | 18.24 | 21.05 |
| Resin J, Modified by Silane #3 | 23.84 | 27.08 |
| Resin K, Modified by Silane #3 | 24.75 | 27.33 |
| Resin L, Modified by Silane #3 | 26.11 | 31.28 |
| Resin L, Modified by Silane #3 | 27.35 | 33.86 |

Based on the above results, the use of a silane coupling agent to modify a urea-formaldehyde base resin, preferably via a covalent link, provides depressants having good performance in ore benefication via froth flotation. The use of such depressants has been confirmed for urea-formaldehyde base resins having number average molecular weights of up to about 4000 g/mole.

EXAMPLE 8

A urea-formaldehyde (UF) resin, modified with a silane coupling agent as described above, was tested for its ability to reduce the dewatering time, by filtration, of various solid contaminants suspended in aqueous slurries. In each experiment, a 25 gram sample of solid contaminant was uniformly slurried with 100 grams of 0.01 molar $KNO_3$. The pH of the slurry was measured. The slurry was then subjected to vacuum filtration using a standard 12.7 cm diameter Buchner funnel apparatus and 11.0 cm diameter Whatman qualitative #1 filter paper. The dewatering time in each case was the time required to recover 100 ml of filtrate through the filter paper.

For each solid contaminant tested, a control experiment was run, followed by an identical experiment, differing only in (1) the addition of 0.5-1 grams of silane modified UF resin to the slurry and (2) mixing of the slurry for one additional minute, after a uniform slurry was obtained upon stirring. Results are shown below in Table 6.

TABLE 6

Dewatering Time for Aqueous Slurries
(25 grams Solid Contaminant in 100 grams 0.01 M $KNO_3$)

| Solid | Control | Control + 0.5-1 grams Silane-Modified UF Resin |
|---|---|---|
| Geltone* | 13.1 seconds | 8.2 |
| (slurry pH) | (8.1) | (8.5) |
| Bentonite | 5.3 | 2.3 |
| (slurry pH) | (8.8) | (8.8) |
| Graphite | 8.1 | 5.2 |
| (slurry pH) | (4.4) | (4.5) |
| Kaolin | 10.5 | 5.4 |
| (slurry pH) | (3.3) | (3.7) |
| Talc (<10 micron) | 2.0 | 1.3 |
| (slurry pH) | (8.8) | (8.9) |

*brand name for montmorillonite clay

The above results demonstrate the ability of silane-modified UF resins, even when used in small quantities, to significantly decrease the dewatering time for a number of solid particles.

EXAMPLE 9

Another urea-formaldehyde (UF) resin, modified with a silane coupling agent as described above, was tested for its ability to reduce the dewatering time, by filtration, of solid contaminants suspended in an aqueous slurry. Filtration tests were conducted using the modified base resin alone and in combination with polyacrylic acid (PAA) at various ratios. In each case, the initial filtration rate as well as the total time required for the filtration (i.e., the dewatering time), was determined. Results are shown below in Table 7.

TABLE 7

Initial Filtration Rate and Dewatering Time for Carlsbad Tailings

| Dewatering Agent (Silane-Modified UF Resin/PAA) | Initial Filtration Rate (grams/second) | Total Filtration Time (seconds) |
|---|---|---|
| 2 ml/0 ml | 0.33 | 68 |
| 1 ml/2 ml | 0.30 | 75.5 |
| 4 ml/1 ml | 0.32 | 79 |
| 4 ml/2 ml | 0.31 | 83.5 |
| 1 ml/1 ml | 0.25 | 88 |
| 0 ml/0 ml | 0.16 | 158 |
| 0 ml/2 ml | 0.11 | 203 |

The above results demonstrate the ability of silane-modified UF resins, when used either alone or with an additional dewatering agents, to improve the dewatering of solids suspended in aqueous slurries.

EXAMPLE 10

The urea-formaldehyde base resin, denoted Resin F in Table 1 above, was modified by the substituted silane coupling agent #3 (aminopropyltriethoxysilane, Silane A1100, available under the trade name Silquest (GE Silicones-OSi Specialties, Wilton, Conn., USA)), as described above in Table 2. The modification of this base resins was performed according to procedures described above in Example 2.

The resulting modified amine-aldehyde resin was used to treat aqueous slurries of coal ore prior to cyclone separation operations, in order to evaluate cyclone separation efficiency at various resin addition levels. One cyclone separation operation processed relatively small coal particles in the aqueous resin-treated feed (or sump) to a heavy medium cyclone. A second cyclone separation operation processed relatively large coal particles in the aqueous resin-treated feed (or sump) to a clarifying cyclone. At each resin addition level, the purified coal, obtained as the combined product of these cyclones run in parallel, was analyzed for ash, sulfur, and mercury impurities, as well as moisture content and fuel value, measured in BTU per lb. The temperature of the slurries varied from 22-35° C., although any temperature at which the slurries are liquid (e.g., from 0-55° C.) could theoretically be employed. The results of the coal purification study are summarized in Table 8 below.

TABLE 8

Cyclone Separation of Aqueous Coal Ore Slurries, at Various Amine-Aldehyde Resin Addition Levels

| Hvy Med Cyclone, lb/ton resin added | Clarifying Cyclone, lb/ton resin added | Purified Coal Ash, wt-% | Purified Coal Sulfur wt-% | Purified Coal Moisture wt-% | Purified Coal BTU/lb |
|---|---|---|---|---|---|
| 0 | 0 | 11.93 | 1.25 | 8.64 | 11,882 |
| 0.1 | 0.25 | 10.78 | 1.18 | 6.45 | 12,364 |
| 0.25 | 0.5 | 10.39 | 1.14 | 6.42 | 12,598 |

This study demonstrated the ability of the modified amine-aldehyde resin of the present invention to improve the product quality of coal that was purified in size or density classification operations. The amounts of ash (containing siliceous clay materials), sulfur, and moisture in the purified coal were less than the corresponding amounts obtained in the purified coal (i.e., a reference coal) processed in the same cyclone operations, but without addition of the resin. Consistent with these results, the fuel value of the purified coal increased with increasing addition of the modified amine-aldehyde resin.

Although no trace mercury analyses were performed on the purified coal, it is believed that the predominant mercury-containing compound in the coal ore was mercuric sulfide. The observed reduction in the sulfur amount, relative to the reference coal recovered in the cyclone separation without added amine-aldehyde resin, would therefore be expected to approximate the reduction in the mercury amount. Thus, a 5.6 wt-% reduction in mercury would be expected to result from the use of 0.1 lb/ton and 0.25 lb/ton resin added to the heavy medium cyclone feed and clarifying cyclone, respectively, as described in the experiment above. Likewise, an 8.8 wt-% reduction in mercury would be expected to result from the use of 0.25 lb/ton and 0.5 lb/ton resin added to the heavy medium cyclone feed and clarifying cyclone, respectively, also as described in the experiment above.

EXAMPLE 11

The modified amine-aldehyde resin described above in Example 10 was tested for its ability to improve the efficiency of a coal beneficiation process using froth flotation. The resin was used to treat an aqueous slurry of impure coal ore, containing approximately 10-15 wt-% solids, by adding the resin at various addition levels. Treating of the slurry prior to the froth flotation step also included conditioning of the slurry by mixing the slurry with the added resin for about 4 minutes, prior to initiating froth flotation in a froth flotation cell conventionally used for coal. The amount of solids, expressed as a weight percentage, was measured in the product (overhead) stream from the froth flotation, carrying the purified coal. The moisture level of the purified coal (after screening) was also determined by analysis. In the "tailings" (or bottoms) stream carrying the solids that were depressed in the froth flotation, the amount of solids, expressed as a weight percentage, was measured. Also measured were the amounts of sulfur and ash impurities collected over a 1 hour period of steady state operation. A further analysis of the tailings stream was conducted to determine the total amount of mercury in mg/liter. Three separate trials were run, with a reference experiment performed in each trial with no added modified amine-aldehyde resin. The results of this study are summarized in Table 9 below.

TABLE 9

Froth Flotation of Aqueous Impure Coal Ore Slurries, at Various Amine-Aldehyde Resin Addition Levels

| Aqueous slurry of impure coal ore lb/ton resin added | Product Stream Solids, wt-% | Purified Coal Moisture, wt-% | Tailings Stream Solids, wt-% | Tailings Stream Sulfur, lb/hr | Tailings Stream Ash, lb/hr | Tailings Stream Mercury, mg/l |
|---|---|---|---|---|---|---|
| TRIAL #1 | | | | | | |
| 0 (reference) | 37.2 | 12.7 | 1.13 | 41.92 | 222.4 | 0.0032 |
| 0.77 | 35.9 | 12.38 | 3.83 | 72.93 | 281.92 | 0.0063 |
| TRIAL #2 | | | | | | |
| 0 (reference) | 37.05 | 12.25 | 1.62 | 46.82 | 183.68 | n/a |
| 1.98 | 26.83 | 11.82 | 5.44 | 96.31 | 322.56 | n/a |
| TRIAL #3 | | | | | | |
| 0 (reference) | 36.76 | 11.13 | 1.27 | 41.10 | 150.72 | 0.0041 |
| 4.25 | 27.42 | 9.73 | 6.18 | 73.86 | 318.4 | 0.0058 |

The above results show that the amounts ash, sulfur, and mercury impurities increased in the tailings (containing the rejected or depressed solids) in each case where the aqueous slurry of impure coal ore was treated with the modified amine-aldehyde depressant, prior to froth flotation. Moreover, the percentage increase in the ash impurity (containing non-combustible material such as siliceous clay) in the tailings appeared to broadly correlate with the amount of resin added, and the improved rejection of unwanted ash was consistent with the increase in the solids level of the tailings stream. As discussed above, the observed increases in both mercury and sulfur in the tailings were consistent with the majority of the mercury impurity being in the form of mercuric sulfide.

The improved recovery of unwanted impurities in the tailings therefore translated to a higher quality purified coal in the product stream, relative to the reference experiments in which no resin depressant was added. Also, the moisture level in the purified coal was reduced in each trial by the addition of the resin depressant. The reduction in moisture correlated with the amount of resin added. Overall the above data demonstrates the advantages associated with using the modified amine-aldehyde resin as a depressant in the froth flotation of coal ore.

What is claimed is:

1. A modified urea-formaldehyde resin for use in solid/liquid separation processes comprising, a urea-formaldehye resin modified with a silane coupling agent, wherein the urea-formaldehyde resin has a mole ratio of urea:formaldehyde in the range of 1:2 to 1:3.

2. The modified base resin of claim 1, wherein said base resin comprises a urea-formaldehyde resin having a number average molecular weight ($M_n$) of greater than about 100 grams/mole.

3. The modified base resin of claim 2, wherein said base resin has a number average molecular weight ($M_n$) from about 400 to about 4000 grams/mole.

4. The modified base resin of claim 1, wherein said modified base resin is in the form of a solution or dispersion having a resin solids content from about 0.1% to about 90% by weight.

5. The modified base resin of claim 1, having a resin solids content of greater that about 90% by weight.

6. The modified base resin of claim 5, wherein said modified base resin is in the form of solid powder, prill, lump, flake or melt.

* * * * *